United States Patent
Okuma

(10) Patent No.: US 7,647,446 B2
(45) Date of Patent: Jan. 12, 2010

(54) NETWORKED ISOCHRONOUS USB COMMUNICATION

(75) Inventor: Keiji Okuma, Costa Mesa, CA (US)

(73) Assignee: Silex Technology, Inc., Kyoto (JP)

( * ) Notice: Subject to any disclaimer, the term of this patent is extended or adjusted under 35 U.S.C. 154(b) by 272 days.

(21) Appl. No.: 11/733,312

(22) Filed: Apr. 10, 2007

(65) Prior Publication Data

US 2008/0082717 A1 Apr. 3, 2008

Related U.S. Application Data

(60) Provisional application No. 60/828,026, filed on Oct. 3, 2006.

(51) Int. Cl.
*G06F 13/20* (2006.01)
*H04N 1/32* (2006.01)
*G06F 13/42* (2006.01)
*G06F 1/12* (2006.01)

(52) U.S. Cl. .................. 710/313; 710/106; 358/1.15; 358/426.1

(58) Field of Classification Search .................. 710/313
See application file for complete search history.

(56) References Cited

U.S. PATENT DOCUMENTS

| | | | |
|---|---|---|---|
| 5,996,031 A * | 11/1999 | Lim et al. .................. 710/52 |
| 6,311,294 B1 * | 10/2001 | Larky et al. .................. 714/44 |
| 6,334,161 B1 | 12/2001 | Suzuki et al. |
| 6,389,029 B1 | 5/2002 | MacAlear |
| 6,581,098 B1 | 6/2003 | Kumpf |
| 6,904,489 B2 | 6/2005 | Zarns |
| 6,912,651 B1 * | 6/2005 | Hamdi et al. .................. 713/1 |
| 7,028,133 B1 * | 4/2006 | Jackson .................. 710/313 |
| 7,050,184 B1 * | 5/2006 | Miyamoto .................. 358/1.15 |

(Continued)

FOREIGN PATENT DOCUMENTS

JP 1998 10-233820 9/1998

(Continued)

OTHER PUBLICATIONS

Silex Technology—"SX-1000U USB Device Driver"; 1 page, Date Unknown.*

(Continued)

*Primary Examiner*—Mark Rinehart
*Assistant Examiner*—Brian T Misiura
(74) *Attorney, Agent, or Firm*—Ogilvie Law Firm

(57) ABSTRACT

Methods and systems are provided for helping maintain isochronous communications with peripheral devices (308), such as USB devices, over a network (302). Some methods for facilitating isochronous IN communication include noting (1906) passage of a predetermined interval without communication (310) from the peripheral device driver (402), and then creating (1908) a dummy communication (312) and sending (1910) it over the network toward the peripheral device to maintain isochronous communication toward the peripheral device. Some methods for facilitating isochronous OUT communication include noting (2006) passage of a predetermined interval without receipt, over the network, of a responsive communication (310) from the peripheral device in response to a first communication, and then creating (2008) a dummy communication (312) and sending (2010) it toward the peripheral device driver to maintain isochronous communication transmissions toward the peripheral device driver. The interval between isochronous communication transmissions may be changed (1930) to optimize buffer (314) usage, and delays may be controlled (1922, 2016).

7 Claims, 16 Drawing Sheets

U.S. PATENT DOCUMENTS

| | | | |
|---|---|---|---|
| 2002/0141418 A1 | 10/2002 | Ben-Dor et al. | |
| 2003/0014569 A1 | 1/2003 | Kim | |
| 2004/0090984 A1 | 5/2004 | Saint-Hilaire et al. | |
| 2005/0209842 A1 | 9/2005 | Klein | |
| 2005/0210176 A1 | 9/2005 | Zarns | |
| 2006/0020736 A1 | 1/2006 | Jackson | |
| 2006/0179144 A1* | 8/2006 | Nagase | 709/226 |
| 2008/0005432 A1* | 1/2008 | Kagawa | 710/106 |
| 2008/0127226 A1* | 5/2008 | Fujita et al. | 719/321 |
| 2008/0183920 A1* | 7/2008 | Jiang et al. | 710/53 |

FOREIGN PATENT DOCUMENTS

| | | |
|---|---|---|
| JP | 2001 144828 | 5/2001 |
| JP | 2001 156797 | 6/2001 |
| WO | WO 00 57587 | 9/2000 |
| WO | WO 2006 082782 | 8/2006 |

OTHER PUBLICATIONS

Silex Technology—"10/100 Mbps USB 2.0 device server: SX-5000U2"; 2 pages, Date Unknown.*

Silex Technology—"SX-2000U2 Hi-Speed USB Device Server"; 1 page, Date Unknown.*

Silex Technology—"SX-2000WG Hi-Speed USB 802.11g Wireless Device Server"; 1 page, Date Unknown.*

"What is a device server", from www.silexamerica.com, no later than Oct. 3, 2006.

"KernelDriver 5.20 User's Guide" excerpts, http://jp.xlsoft.com/documents/windriver/kdman.pdf, Nov. 27, 2002.

* cited by examiner

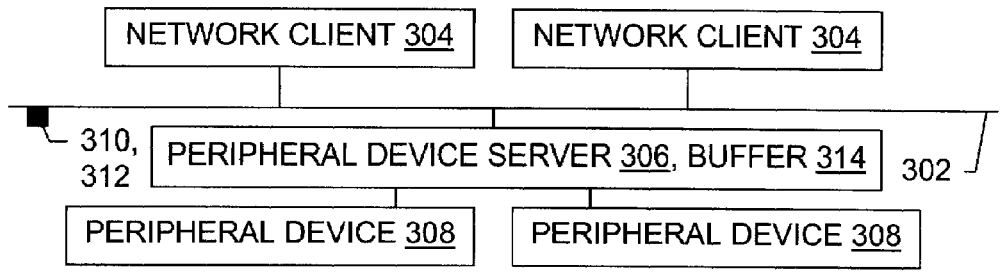
Fig. 3
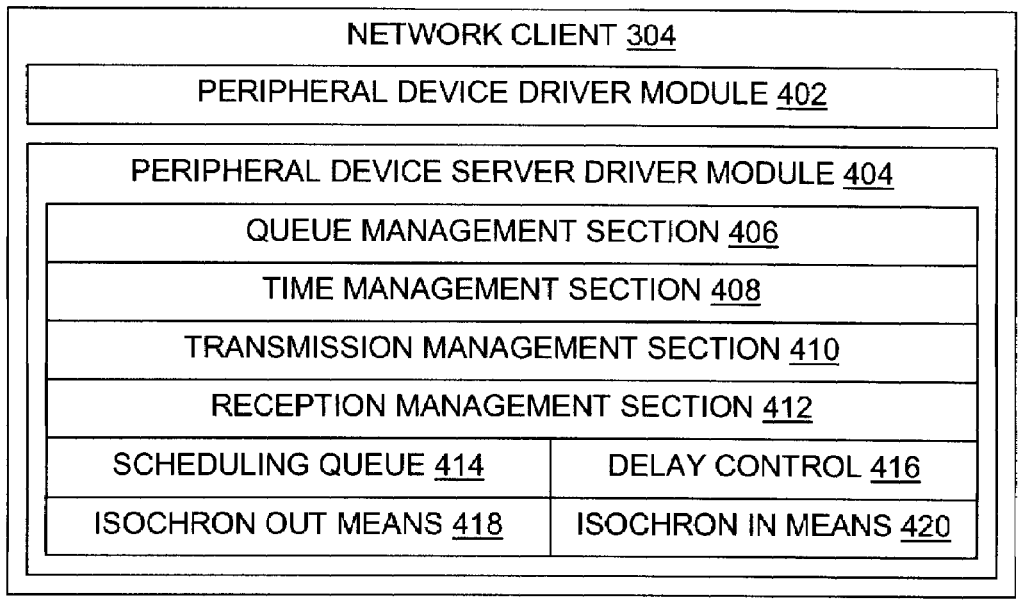
Fig. 4
| ID | IRP Pointer | Transmission Schedule Time | Completion Schedule Time | Status |
|---|---|---|---|---|
| 1 | 0x8f004000 | 1310 | 1410 | awaiting transmission |
| 2 | 0x8f003000 | 1300 | 1400 | during transmission |
| 3 | completed | 1290 | 1390 | awaiting reception |
| 4 | completed | 1280 | 1380 | during reception |
| 5 | | | | vacant |
Fig. 5

NETWORKED ISOCHRONOUS USB COMMUNICATION

RELATED APPLICATIONS

This application claims priority to, and incorporates by reference, U.S. provisional patent application Ser. No. 60/828,026 filed Oct. 3, 2006.

TECHNICAL BACKGROUND

When connecting a USB (Universal Serial Bus) device with an isochronous data port to a PC (Personal Computer), the USB device and the PC cannot be placed too far apart from each other. Typically, the USB device plugs into the PC using a cable that is at most a few meters long. In order to place the USB device with the isochronous data port at a greater distance from the PC, there is a device for replacing a USB bus with a network cable or an optical fiber cable, but it is a one-to-one connection, so that it cannot be connected to a network; see Japanese Unexamined Patent Publication No. 2002-542527. There is also a technology that controls the USB device from a network client via the network to a peripheral device server to which the USB device is connected; see the discussion from Silex Technology Inc., owner of the present application, of a USB device server, at:

www dot silex dot jp/japan/products/network/what/index3 dot html (Japanese)

www dot silexamerica dot com/us/products/network/what/index3 dot html (English)

Although this document includes website addresses, the addresses and the material on the sites addressed by the stated addresses are provided only for background. This document does not incorporate by reference any essential material from those websites.

The silex USB device server in question has certain characteristics. As illustrated generally in FIG. 1, a peripheral device driver module transmits an IRP (I/O Request Packet) to a peripheral device server driver module which is preliminarily installed in the network client. The peripheral device server driver module stores the IRP on a queue, and encapsulates a whole or part of the IRP to then pass it to the network. The peripheral device server on a receiving side of the network transmission retrieves transmitted data from the received encapsulated data and reconstructs the data to thereby transmit it to a peripheral device. Response data transmission in the opposite direction is similarly encapsulated and transmitted from the peripheral device via the peripheral device server over the network to the peripheral device server driver module. The peripheral device server driver module retrieves the response data from the received encapsulated data. At this time, the response data is stored in the IRP which has been stored previously, and the IRP is returned to the peripheral device driver, and this queue entry is deleted. As a result of this process, a user can use the peripheral device connected to the peripheral device server as if it is directly connected to the network client.

When the peripheral device with the isochronous data port in the above-mentioned peripheral device is connected to the network client via the network, however, there have been some problems, such as the following. Since the network client and the peripheral device communicate with each other via the network, a request issued by the peripheral device driver is transmitted through the network to the peripheral device, so that it takes time for the response to be transmitted from the peripheral device to the peripheral device driver. Conventionally, when the peripheral device with the isochronous data port is connected to the network client via the peripheral device server, the connection is created on the premise that the peripheral device driver module incorporated in the network client is directly connected to the network client, so that there has been a problem dealing with a delay of the response to the request when the USB peripheral device has been used via the network.

The context of such delay will be described using communication sequence diagrams shown in FIGS. 1 and 2. FIG. 1 shows a communication sequence of the conventional art upon transmitting isochronous data (isochronous OUT). Referring to FIG. 1, a number given to each of the arrows is a frame number provided to each IRP by the peripheral device server driver module. As shown, the peripheral device driver module first issues IRPs corresponding to frames (1), (2), and (3), collectively, sending them to the peripheral device server driver module. The number of the issued IRPs is generally not determined by the peripheral device server driver module, but is determined by external factors, such as a driver incorporated into an operating system of the network client. Subsequently, the peripheral device server driver module which received the issued IRPs encapsulates data included in the IRPs to transmit it over the network to the peripheral device server. At this time, the peripheral device server driver module stores the transmitted IRPs in a queue. The peripheral device server transmits the received data to the peripheral device for the data to be processed on the peripheral device. Upon completion of the data processing, the peripheral device server notifies the peripheral device server driver module that the data processing has been completed, and the peripheral device server driver module which detected this notification will complete the IRPs stored in the queue. A result of completing the IRPs in this way may be that the peripheral device driver module then issues a new IRP. In normal operation, the peripheral device driver module never issues the next IRP until completing the IRPs issued previously. In FIG. 1, the peripheral device server driver module receives from the peripheral device server a frame G(1) indicating that the processing is completed as to frame (1), and the IRP of frame G(1) will be completed. Thereafter, the new IRP frame (4) is issued from the peripheral device driver module. While such a communication method does not pose a problem when the peripheral device is directly connected to the network client, the delay of completion indicated by frame G(1) leads to the delay in issuing the next IRP frame (4) when the USB peripheral device is connected via the network, resulting in the delay of data transmission to the peripheral device.

FIG. 2 illustrates a communication sequence of the conventional art upon receiving the isochronous data (isochronous IN). While the fundamental communication flow is similar to that of the isochronous OUT described above, it is an isochronous IN sequence illustrated in this case, so that the IRP issued from the peripheral device driver module is the request for data and the received data is included in the frames G(1) to G(5). As can be seen in FIG. 2, the frames (4) and (5) which are data requests to the peripheral device are never issued until completing the IRPs of the frames G(1) and G(2), respectively. Also in this case, like the case of the isochronous OUT, the delay in the network leads to the delay of the arrival of the frames G(1) and G(2), which then leads to the delay of the issuance of the next IRPs, frames (4) and (5), resulting finally in the delay of the data in frames G(4) and G(5) that is to be received by the peripheral device driver module.

In addition, since the isochronous data transfer is managed with time in units of a frame of the bus to which the data is transferred, when the peripheral device is directly connected to the network client, it is the network client itself that manages the timing. However, when the peripheral device with the isochronous data port is connected to the peripheral device server, the timing which the peripheral device follows is given from the peripheral device server, even when the isochronous data is ready to be transferred sooner, resulting in the network client and the peripheral device server respectively holding the clocks with different bases therein. For this reason, the time cannot be synchronized per millisecond, so there has been a problem that the timing to manage the isochronous data transfer has been shifted between the network client and the peripheral device server. Such a problem occurs not only in the USB device with the isochronous data transfer but also in the peripheral device, which must manage and process the isochronous data based on the time to be started for use between certain computers.

Other aspects of technology and practice, discussed herein or previously known to those of skill in the art, may also be helpful in understanding the present invention.

SUMMARY OF THE INVENTION

The present invention provides approaches for controlling the peripheral device, e.g., a method and an apparatus for the same, which may reduce or solve the above-mentioned problems and may facilitate use of the peripheral device through isochronous data transfer between certain computers using the peripheral device server.

Some embodiments of the invention include a method of facilitating isochronous IN communication, with steps such as: receiving from a peripheral device driver a first communication for at least one peripheral device such as a USB peripheral device; sending data from the first communication over a network toward the peripheral device(s); noting passage of a predetermined interval without receipt of a second communication from the peripheral device driver; and then creating a dummy communication and sending it over the network toward the peripheral device(s), thereby maintaining an isochronous sequence of communication transmissions toward the peripheral device(s). The step of creating a dummy communication may copy into the dummy communication data from the communication that was most recently received from the peripheral device driver. In some embodiments, the method includes receiving over the network a responsive communication which responds to the dummy communication, and sending data from the responsive communication to the peripheral device driver. In some embodiments, the method includes holding within a peripheral device server driver module data from a peripheral device driver module instead of forwarding that data to a remote peripheral device, and then sending the held data back to the peripheral device driver module after receiving a communication from the peripheral device in response to data that was forwarded. In some embodiments, communications sent over the network are buffered at a peripheral device server, and the method changes the predetermined interval, thereby changing the number of communications which are buffered.

Some embodiments of the invention include a method of facilitating isochronous OUT communication, with steps such as: receiving from a peripheral device driver a first communication for a peripheral device; sending data from the first communication over a network toward the peripheral device; noting passage of a predetermined interval without receipt, over the network, of a responsive communication from the peripheral device in response to the first communication; and then creating a dummy communication and sending it toward the peripheral device driver, thereby maintaining an isochronous sequence of communication transmissions toward the peripheral device driver. The first communication may include an I/O Request Packet from the peripheral device driver, for instance. In some embodiments, the method includes receiving over the network and after passage of the predetermined interval a responsive communication which responds to the first communication, and discarding that responsive communication without sending it to the peripheral device driver. In some embodiments, the method includes repeating the steps of sending a dummy communication toward the peripheral device driver, until a responsive communication which responds to the first communication is received, and then sending data from that responsive communication to the peripheral device driver.

Some embodiments of the invention include a system for isochronous communication, with components such as: a peripheral device server driver module; and a dummy communication which is created by the peripheral device server driver module and transmitted from the peripheral device server driver module, thereby maintaining isochronous communication in the absence of a timely communication that was created elsewhere and sent to the peripheral device server driver module. In some embodiments, the peripheral device server driver module includes a scheduling queue representing isochronous communications, and also includes a management component for managing the scheduling queue. In some embodiments, the peripheral device server driver module includes a delay control component for repeatedly creating dummy communications to a peripheral device driver module to prevent the peripheral device driver module from timing out while the peripheral device server driver module waits for a responsive communication to arrive from a peripheral device over a network. In some embodiments, the peripheral device server driver module includes an isochronous IN communication means for helping maintain isochronous IN communication from a peripheral device driver module to a peripheral device over a network, an isochronous OUT communication means for helping maintain isochronous OUT communication from a peripheral device over a network to a peripheral device driver module, or both of these means. In some embodiments, the system includes a peripheral device server having a buffer for holding isochronous communications, and the system also includes a means for changing the number of buffered isochronous communications by changing the interval between isochronous communication transmissions.

Although many of the examples given herein are methods, the invention provides generally corresponding devices, systems, configured computer-readable storage media, signals, and process products, as well as methods. The examples are merely illustrative. The present invention is defined by the claims, and to the extent this summary and/or incorporated material from a parent priority document conflicts with the claims, the claims should prevail.

DRAWINGS

To illustrate the manner in which the advantages and features of the invention are obtained, a description of the present invention is given with reference to the attached drawings. These drawings only illustrate selected aspects of the invention and thus do not fully determine the invention's scope.

FIG. 3 is a block diagram illustrating a system which may be adapted for use according to the present invention through suitable components (software and/or circuitry).

FIG. 4 is a block diagram further illustrating a network client shown in FIG. 3.

FIG. 5 is a diagram further illustrating a scheduling queue shown in FIG. 4.

DETAILED DESCRIPTION

Introduction

Figure 1:
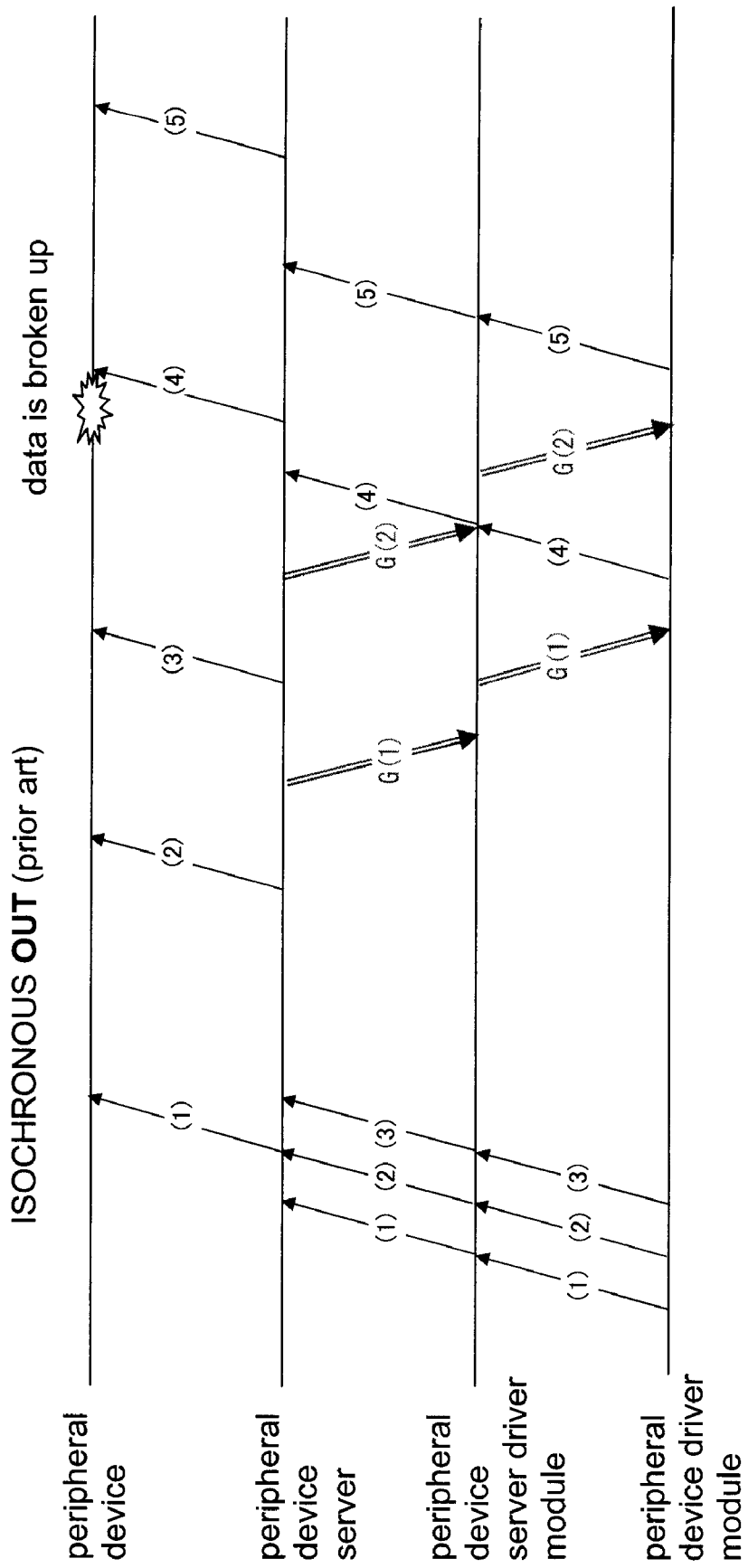
FIG. 1 is a communication sequence diagram illustrating USB communication over a network in a conventional system, namely, a conventional isochronous OUT communication sequence.

The invention is illustrated in text and drawings by specific examples, but it will be appreciated that other embodiments of the invention may depart from these examples. For instance, specific features of an example may be omitted, renamed, grouped differently, repeated, instantiated in hardware and/or software differently, performed in a different order, or be a mix of features appearing in two or more of the examples. Reference is made to the figures throughout by reference numerals. Any apparent inconsistencies in the phrasing associated with a given reference numeral, in the figures or in the text, should be understood as simply broadening the scope of what is referenced by that numeral.

Definitions of terms are provided explicitly and implicitly throughout this document. Terms do not necessarily have the same meaning here that they have in general usage, in the usage of a particular industry, or in a particular dictionary or set of dictionaries. The inventor asserts and exercises his right to his own lexicography.

For example, as used herein "communication" means one or more frames, packets, or signals, which carry data and/or other information. Instead of carrying data, or in addition to carrying data, a communication may be sent as an acknowledgment or to otherwise control, manage, or test a protocol, for example. Thus, data is a payload in some (but not necessarily all) communications.

All claims as filed are part of the specification and thus help describe the invention, and repeated claim language may be inserted outside the claims as needed. In the claims a reference to an item generally means at least one such item is present and a reference to a step means at least one instance of the step is performed. Headings are for convenience; information on a given topic may be found outside the section whose heading indicates that topic.

Referring to FIG. 3, a network environment of one embodiment of the present invention is illustrated. Connected to a network 302 are network clients 304 and a peripheral device server 306. Peripheral devices 308 are connected to the peripheral device server 306. The network 302 may be a LAN (Local Area Network), for instance, or multiple connected LANs. Larger networks may also be used in some embodiments. Although two peripheral devices 308 are shown, one or more peripheral devices 308 may be present in a given embodiment. Likewise, although two network clients 304 are shown, one or more network clients 304 may be present in a given embodiment. Multiple peripheral device servers 306, either separately addressed for concurrent use or else in a failover configuration, may also be present in a given embodiment. Communications 310, 312 travel over the network 302. As explained further below in connection with FIGS. 6 and 11, communications 310 are regular communications in a normal sequence, carrying data as it travels between a peripheral device 308 and a peripheral device driver module 402. By contrast, communications 312 are dummy communications created to compensate for gaps in the normal sequence and thus prevent peripheral device driver module 402 from timing-out.

FIG. 4 further illustrates some items shown in FIG. 3. In one configuration, a peripheral device driver module 402 and a peripheral device server driver module 404 are installed in the network client 304. The peripheral device driver module 402 can be a conventional peripheral device driver module of the type used to drive USB peripheral devices in conventional configurations, such as when the USB peripheral device is directly connected to the network client instead of being connected through a network. That is, the present invention does not necessarily require any modifications to existing installed USB peripheral drivers on client machines.

The peripheral device server driver module 404 includes a queue management section 406, a time management section 408, a transmission management section 410, a reception management section 412, and a scheduling queue 414 that these four management sections refer to. The management sections 406, 408, 410, 412 and the scheduling queue 414 may be implemented in hardware, in firmware, in software, or in some combination of hardware, firmware, and/or software, depending on factors such as cost, number of copies, testing version versus production model, modularity, and so on.

In some embodiments, two or more of the sections 406, 408, 410, 412 execute at least partially in parallel. For instance, the time management section 408 may start working even though the queue management section 406 has not completed. In some other embodiments, execution starts with the queue management section 406, goes completely through that section, then goes to the time management section 408 and through it, then goes to the transmission management section 410 and through it, then goes to the reception management section 412 and through it, and then goes back to the queue management section 406 and repeats. The four sections normally run in a loop for as long as there is at least one queue entry in a queue. However, the order of the remaining sections normally is different for isochronous OUT (a.k.a. ISO-OUT) than for isochronous IN (a.k.a. ISO-IN), as illustrated and discussed herein.

In some alternate embodiments, execution order allows the flow of control to jump from a first section into a second section before finishing the first section. For instance, execution could jump from the queue management section at step 708, go through all of the time management section, and then jump back to finish the queue management section, continuing after step 708. More generally, sections could execute in parallel if two or more processors are available, e.g., execution of the queue management section could overlap with execution of the time management section. Some embodiments of the invention can work in a multiprocessor environment. Appropriate mechanisms can be used to coordinate parallel execution of two or more sections to prevent deadlock and data corruption, e.g., when updating status, the kernel function SpinLock( ) can be used to prevent updating and referring to the status at the same time.

Embodiments of the present invention may help achieve communication of isochronous data by operations of the respective management sections included in the above-mentioned peripheral device server driver module 404 and the peripheral device server 306. Since the operations are different for isochronous OUT than for isochronous IN, they are separately described below.

Isochronous Data Transmission (Isochronous OUT)

First a basic communication procedure of isochronous OUT in this embodiment will be described. The peripheral device server driver module 404 receives an IRP from the peripheral device driver module 402, and registers an ID, a transmission schedule time, a completion schedule time, and the IRP into the queue list 414 as one queue entry; see, e.g., FIG. 5. Subsequently, a data portion of the IRP and the ID from the queue list are transmitted as a command to the peripheral device server 306 when the transmission schedule time expires. The peripheral device server driver module 404 transmits a completion notice of the IRP to the peripheral device driver module 402 when the current time runs over the completion schedule time of the IRP. The peripheral device server 306 receives the command described above from the peripheral device server driver module 404, sends the command to the peripheral device 308, receives response data from the peripheral device 308, and returns the response data and the ID of the command to the peripheral device server driver module 404. The peripheral device server driver module 404 searches the scheduling queue 414 for a queue entry having the same ID, and deletes the corresponding queue entry from the list 414. By managing the queue with the IRP in this manner, even a peripheral device with an isochronous data port (isochronous OUT) which communicates between networked computers can establish communication between the peripheral device driver module 402 and the peripheral device 308.

Figure 6:
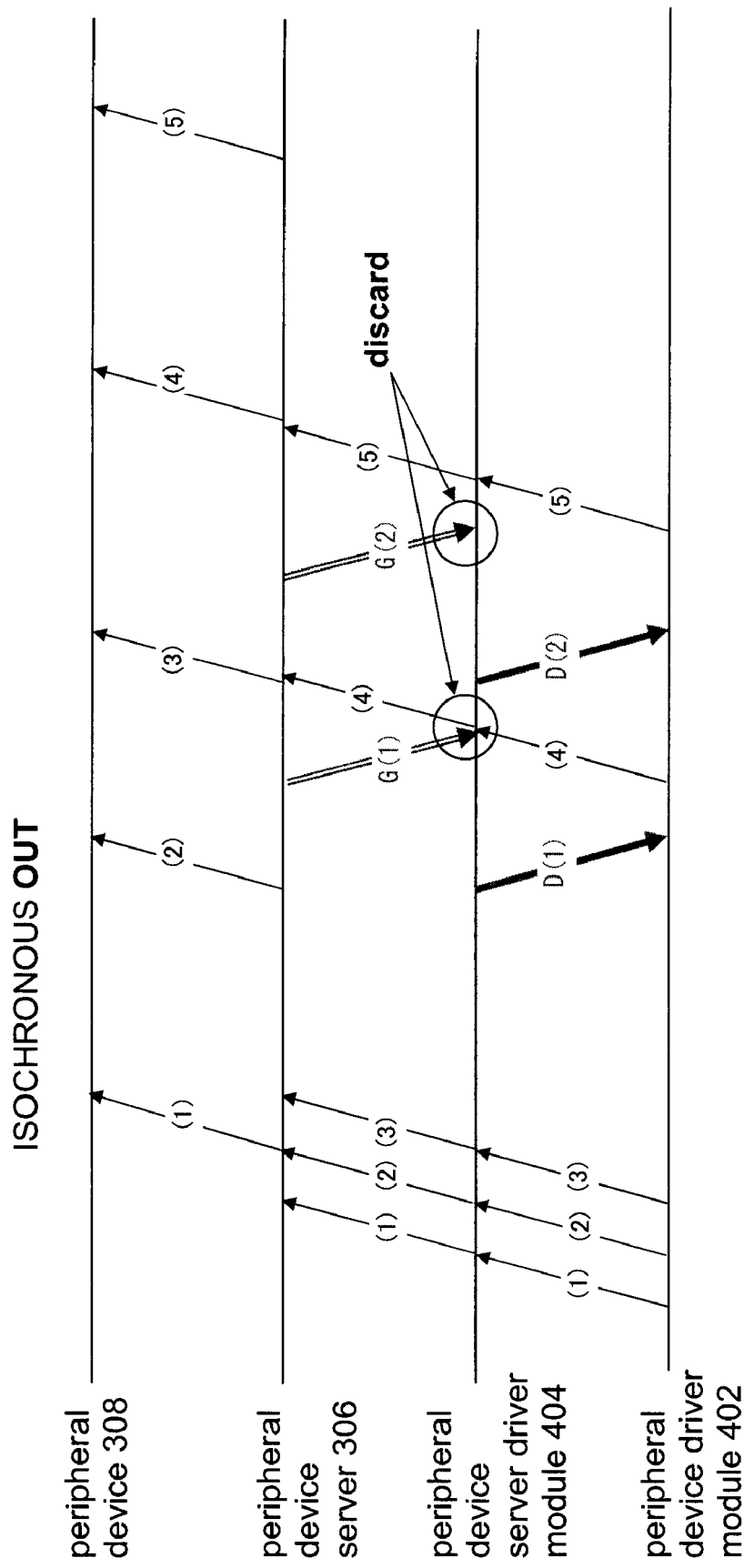
FIG. 6 is a communication sequence diagram illustrating USB isochronous OUT communication over a network in a system according to the present invention.
Figure 7:
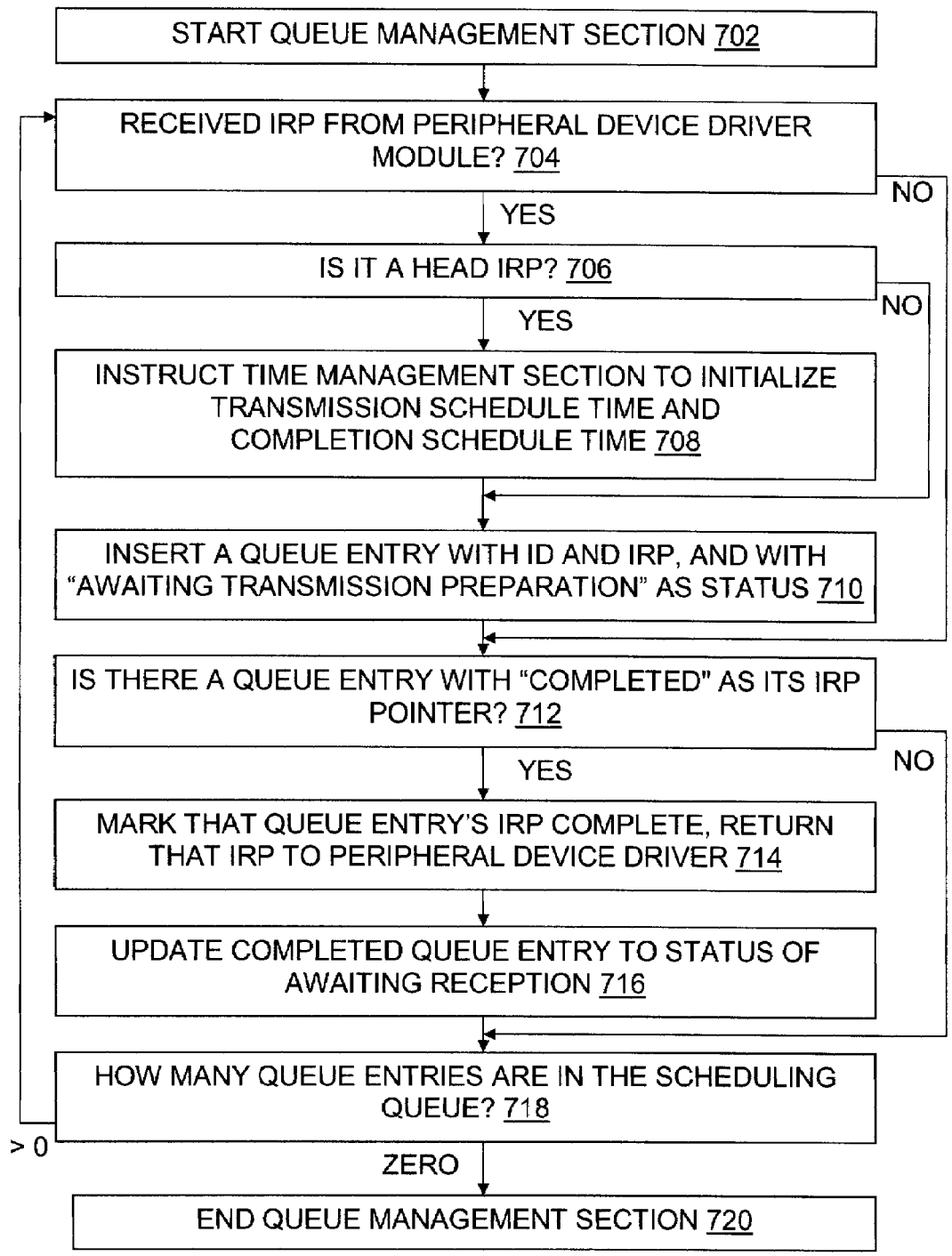
FIG. 7 is a flowchart illustrating operation of a queue management section according to the present invention, such as the queue management section shown in FIG. 4, for managing a queue such as the queue shown in FIG. 5, during isochronous OUT communication.
Figure 8:
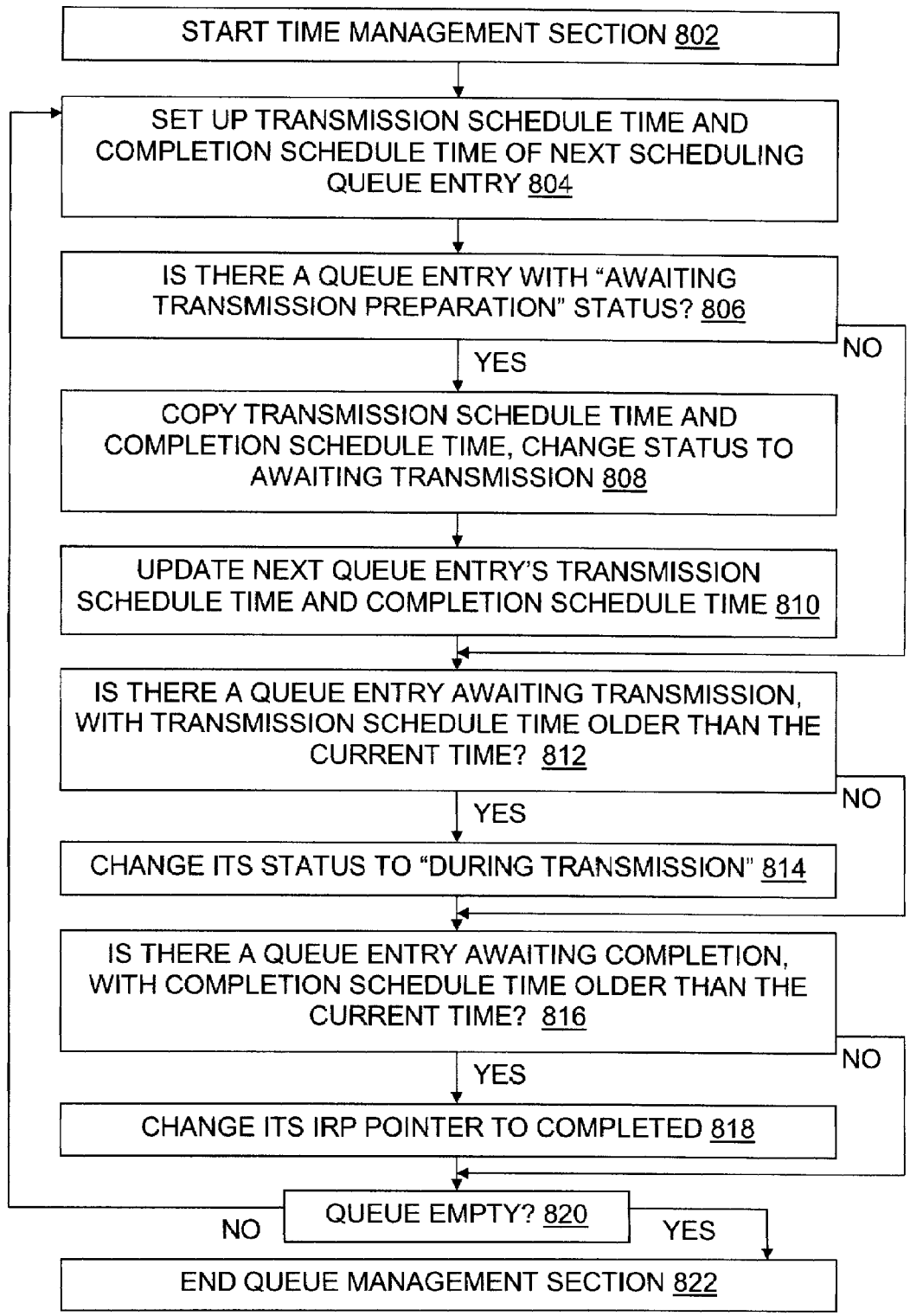
FIG. 8 is a flowchart illustrating operation of a time management section according to the present invention, such as the time management section shown in FIG. 4, during isochronous OUT communication.
Figure 9:
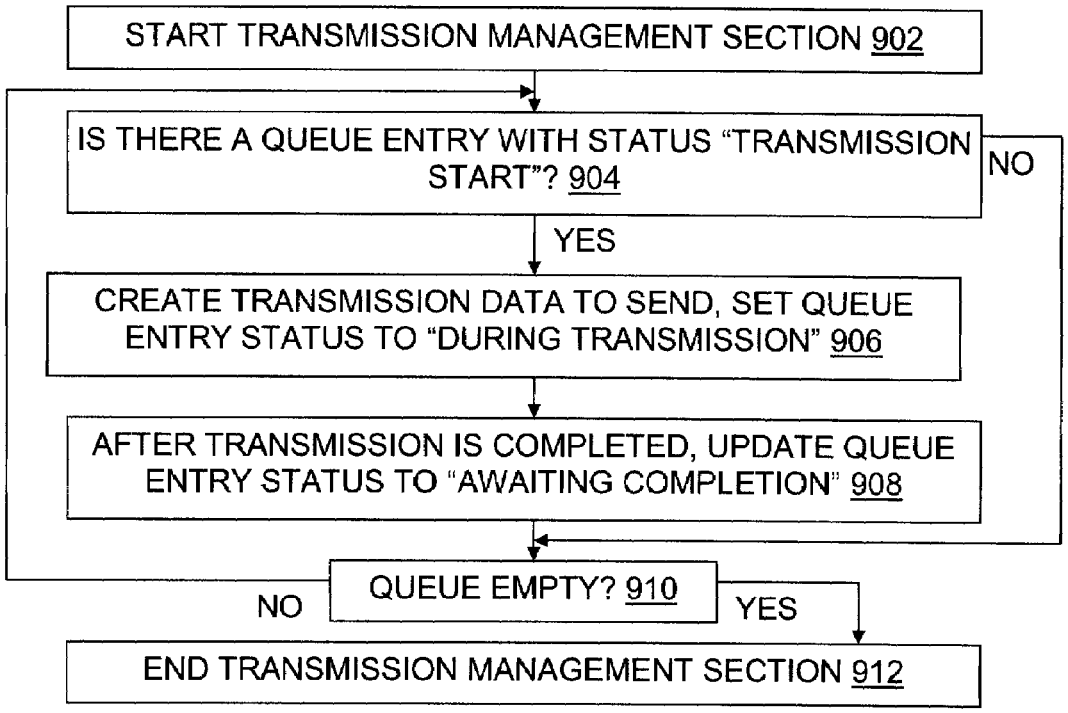
FIG. 9 is a flowchart illustrating operation of a transmission management section according to the present invention, such as the transmission management section shown in FIG. 4, during isochronous OUT communication.
Figure 10:
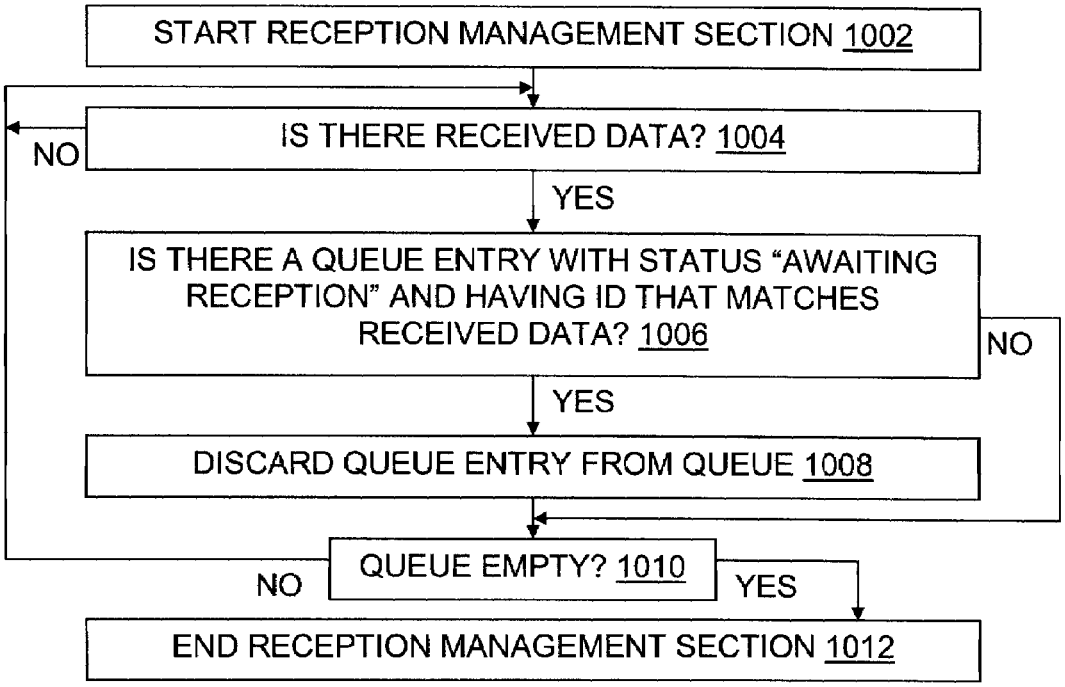
FIG. 10 is a flowchart illustrating operation of a reception management section according to the present invention, such as the reception management section shown in FIG. 4, during isochronous OUT communication.

The context of isochronous OUT communication will be further described using, as an example, the queue data shown in FIG. 5 and a communication sequence shown in FIG. 6. The queue 414 data shown in FIG. 5 is in the form of a table, but it will be understood that queues 414 can be implemented using arrays, tables, linked lists, other linked data structures, and other structures that are generally familiar in the programming arts. The IDs in the table of FIG. 5 are unique identification numbers corresponding to respective IRPs; it will be understood that ID values may eventually repeat, provided the range of ID values is large enough, e.g., larger than the maximum number of expected queue entries. In this embodiment, the reference to the IRP represents a memory address (pointer) to a correspondent IRP when the IRP is not completed, and it represents completion ("completed"—a value not used as a valid pointer) when the IRP has been completed. To prevent confusion, different addresses are shown for each IRP entry in FIG. 5. Each IRP pointer has a unique address, but it may sometimes happens that the newer IRP in a queue may have the same address as another IRP that has just completed, since memory can be reused.

Other status values are shown separately, in a column labeled "Status" in FIG. 5; a state or Status value represents a present state of each IRP, as described elsewhere herein. Other embodiments may arrange the location of status values differently, e.g., placing them all in the IRP Pointer column. To an extent that will be apparent, a different set of status values may also be used in other embodiments. The transmission schedule time and the completion schedule time are filled with values set by the time management section 408, as described elsewhere herein.

The status column in FIG. 5 has several possible values, namely, "waiting for transmission preparation", "transmission start", "awaiting transmission", "during transmission", "awaiting reception", "during reception", and "waiting for completion". Note that "waiting for" and "awaiting" are used interchangeably herein. For instance, a status of "awaiting reception" and a status of "waiting for reception" are functionally the same. Also, "completion" and "completed" are interchangeable status descriptions. The status "during reception" is included merely for conceptual completeness; it is not used in the process flowcharts of FIGS. 7-10, 12-15, there is no section for checking or polling that status value, and that status value is not a trigger or condition satisfaction for other sections or processes.

Comparison of FIG. 6 with FIG. 1 is instructive. Recall that FIG. 1 shows the conventional art. As described above, the peripheral device driver module 402 in communications according to FIG. 1 issues some IRPs (frames (1), (2), and (3)) collectively, and then issues the next IRP only after an IRP which has been issued previously is completed. Accordingly, the frames (4) and (5) are not issued from the peripheral device driver module 402 until the IRPs of the frames (1) and (2) are completed by the conventional peripheral device server driver module. As a result, the arrival of frames (4) and (5) to the peripheral device is delayed and the data has broken off.

According to the present invention, the peripheral device server driver module 404 forces an embodiment to complete the IRP at a specified time, namely when the completion schedule time comes, even when the response from the peripheral device server 306 to the IRP has not yet arrived. In the case shown in FIG. 6, the peripheral device server driver module 404 virtually completes the frame (1) which has not arrived yet, by generating and sending frame D(1). The peripheral device driver module 402 detects frame D(1), accordingly recognizes that the IRP of frame (1) is completed, and issues frame (4) as the next IRP. By operating in this manner, the IRP is issued without any delay, providing isochronism of the data in the peripheral device 308. Meanwhile, the original frames (1) and (2) which return with delay, namely, the frames G(1) and G(2), will be deleted when arriving at the peripheral device server driver module 404. This is because the IRPs of the frames G(1) and G(2) have already been completed by frames D(1) and D(2), respectively, and the peripheral device driver module 402 is not waiting for those responses. The above operation can be achieved by cooperation of the management sections, centering on the queue management section 406.

Referring now to FIGS. 7 through 10, functions and cooperation of the respective management sections in an isochronous OUT operation will be described.

Queue Management Section. When the peripheral device driver module 402 starts communication with an isochronous data port of the peripheral device 308, the peripheral device driver module 402 issues an IRP. This IRP is transmitted to the peripheral device server driver module 404; this may be done using familiar IRP transmission tools and techniques. At step 704, the queue management section 406 checks whether or not the peripheral device driver module 402 has transmitted an IRP. If an IRP has been transmitted, it is checked 706 to see whether or not the IRP received is a first IRP to the isochronous data port of the peripheral device driver 402. Then if it is a first IRP, the procedure proceeds to step 708, and if not, it proceeds to step 710. At step 708, the queue management section 406 instructs the time management section 408 to initialize the transmission schedule time and the completion schedule time. At step 710, the queue management section 406 newly registers the ID, the IRP, and a status of waiting for transmission preparation into the queue list 414 as one list entry. At this point, the transmission schedule time and the completion schedule time are not yet specified in the new queue entry. At step 712, the queue management section 406 searches for a queue entry having a completed status in the queue list, and then if there is such a queue entry, the procedure proceeds to step 714, and if not, to step 718. At step 714, the queue management section 406 sets the status of the IRP registered in the completed queue as STATUS_SUCCESS to return the IRP to the peripheral device driver module 402 (making the IRP complete), and deletes the IRP. STATUS_SUCCESS is a kernel status value, as opposed to a queue-specific status value. By repeatedly returning STATUS_SUCCESS as processing proceeds, the inventive procedure causes the peripheral device driver module 402 to recognize that the processing progresses normally. Thus, the peripheral device driver module 402 can issue the next IRP even when the previous IRP has arrived and/or has not been completed. At step 716, the queue management section 406 updates the completed queue entry to a status of waiting for reception. At step 718, the queue management section 406 checks the number of entries in the queue list 414. Then if there is at least one queue entry, the procedure returns to step 704, and if not, this iteration through the queue management section 406 ends because the transmission to the isochronous data port is completed.

Time Management Section. At step 804, the time management section 408 waits for a request from the queue management section 406 to initialize the transmission schedule time and the completion schedule time of a new queue entry. After the request is received, the time management section 408 sets up the transmission schedule time and the completion schedule time for the queue entry, based on the current time. The values chosen for the transmission schedule time and the completion schedule time depend in part on the timing requirements of the buses involved; timing intervals are also discussed below. The times shown in FIG. 5 are examples; actual times and intervals in a given embodiment may differ from this example. In some embodiments, the transmission schedule time and the completion schedule time of the next queue entry are information that only the time management section 408 manages, and time setting is not carried out to the respective queue entries corresponding to the IRPs at this point. The time management section 408 only prepares and holds the time to be set for the next queue entry, such as in a variable that is local to the time management section 408. At step 806, the time management section 408 searches the queue list 414 for a queue entry that is waiting for transmission preparation. If there is a queue entry waiting for transmission preparation, the procedure proceeds to step 808, and if not, to step 812. At step 808, the time management section 408 copies the transmission schedule time and the completion schedule time prepared at step 804 into the transmission schedule time and the completion schedule time of the queue entry that is waiting for transmission preparation, and changes the status of that entry to awaiting transmission. At step 810, the time management section 408 updates the transmission schedule time and the completion schedule time of the next queue entry, which are held locally within the time management section 408 or otherwise outside the queue 414, to the time for the next queue entry. At step 812, the time management section 408 searches the queue 414 for a queue entry which is in a status of awaiting transmission and for which the transmission schedule time is older than the current time. If there is such a queue entry, this queue entry is changed 814 to have transmission start status, and if not, the procedure proceeds to step 816. At step 816, the time management section 408 searches for a queue entry which is waiting for completion and which also has the completion schedule time older than the current time. If there is such a queue entry, the queue entry is changed 818 to completed status, and if not, the procedure proceeds to step 820. If there no queue entries remain, the time management section 408 terminates its current iteration, and if there is, the procedure returns to step 804.

Transmission Management Section. At step 904, the transmission management section 410 searches for queue entry with status transmission start. When such a queue entry is found, the transmission data is created from the ID and the IRP of that queue entry to be transmitted to the peripheral device server 306, and the status of the queue entry is updated 906 to during transmission. At step 908, after the transmission is completed, the transmission management section 410 updates the queue entry to a status of waiting for completion.

If there is no transmission start queue entry at step 904, the procedure proceeds to step 910. At step 910, if any queue entry remains, the transmission management section 410 returns to step 904, and if not, this iteration of transmission management procedure is terminated.

Reception Management Section. At step 1004, the reception management section 412 waits for received data, and then if there is such data, the procedure proceeds to step 1006, and if not, it continues waiting for the data at step 1004. At step 1006, the reception management section 412 searches the queue list 414 for a queue entry corresponding to the ID of the received reception data, and then if there is such a queue entry, the reception management section 412 deletes that queue entry from the queue list at step 1008. If there is no such queue entry, the received data is discarded and the procedure proceeds to step 1010. At this point, the queue entry is not deleted from the queue list and is left with a status of awaiting reception in the list. At step 1010, if no queue entry remains, the reception management section 412 terminates the current iteration of the procedure, and if it remains, the procedure returns to step 1004.

Flow. In some embodiments, the isochronous communication (both IN and OUT) is achieved by the respective management sections 406, 408, 410, 412 described above operating in cooperation with each other. Specifically, the first IRP received by the queue management section 406 from the peripheral device driver module 402 serves as a trigger to start the operations described above, and thereafter, the statuses of the IRPs registered in the queue list 414 change in sequence, so that the processing proceeds. FIGS. 7 through 10 may be referred to for the relation of the respective management sections in isochronous OUT communications. Table 1 also illustrates procedure flow, with the rows of the table representing a sequence of steps related to status change; these steps are extracted from FIGS. 7-10, and hence Table 1 refers to step numbers in those Figures. The step numbers in Table 1 indicate points in the execution of an indicated management section at which a condition checked by another management section has been satisfied. Reference may also be made to sheet 13/24 of the priority provisional application, bearing in mind the step renumbering in the present Figures.

TABLE 1

Isochronous OUT Queue status transitions

| Management Section | Transition Trigger | Status | Step |
|---|---|---|---|
| Queue Management 406 | Receive the IRP from peripheral device driver module 402 | Waiting for transmission preparation | 710 |
| Time Management 408 | Existence of queue element with "waiting for transmission preparation" status | Awaiting transmission | 808 |
| Time Management 408 | Existence of queue element with "awaiting transmission" status, and the current time has run over the transmission schedule time of that queue element | Transmission start | 814 |
| Transmission Management 410 | Existence of queue element with "transmission start" status | During transmission | 906 |
| Transmission Management 410 | Completion of the transmission | Waiting for completion | 908 |
| Time Management 408 | Existence of queue element with "waiting for completion" status, and the current time has run over the completion schedule time of that queue element | Completed | 818 |
| Queue Management 406 | Existence of queue element with "completed" status | Awaiting reception | 716 |
| Reception Management 412 | Existence of received data, and existence of queue element having "awaiting reception" status | (discard the queue element) | 1008 |

There is some flexibility in designation of the steps at which a condition sought by another management section is satisfied. In the underlying provisional application, for example, similar condition satisfaction points are indicated on sheet 6/24 of the drawings. Using the present document's step numbering, the condition satisfaction points shown in that provisional drawing are as follows: By step 708 of the queue management section, execution of the time management section beginning at step 802 is triggered. By step 814 of the time management section, execution of the transmission management section beginning at step 902 is triggered. By step 908 of the transmission management section, execution of the time management section at step 816 is triggered. By step 818 of the time management section, execution of the queue management section at step 712 is triggered. By step 716 of the queue management section, execution of the reception management section at step 1002 is triggered.

Referring now to FIGS. 7 through 10 and to Table 1, the peripheral device server driver module 404 receives the IRP from the peripheral device driver module 402, and the queue entry of this IRP is set to a status of waiting for transmission preparation in the queue management section 406 (step 710). In the time management section 408, if there is a queue entry waiting for transmission preparation, the status is changed to a status of awaiting transmission (step 808), and if there is a queue entry awaiting transmission and the current time has run over the transmission schedule time of the queue entry, status is changed to transmission start. In the transmission management section 410, if there is a transmission start queue entry, the transmission is started and the status is changed to a status of during transmission, and then when the transmission is completed, it is changed to a status of waiting for completion. In the time management section 408, if there is a queue entry waiting for completion and the current time has run over the completion schedule time of the queue entry, the status is changed to completed. In the queue management section 406, if there is a completed queue entry, the IRP of this queue entry is completed and the status is changed to a status of awaiting reception. In the reception management section 412, the data is received from the peripheral device server 306, and then if the ID included in this data and the ID of the queue entry that is waiting for reception match with each other, this waiting for reception queue entry is deleted.

Some Effects. With this method, the number and timing to transmit the isochronous data (isochronous OUT) can be adjusted by setting the transmission schedule time and the completion schedule time to the queue. Namely, by setting the completion schedule time and forcing a response to the IRP transmitted from the peripheral device driver module 402, the next data to transmit can be issued by the peripheral device driver module 402 even when the peripheral device server 306 is still processing data. In addition, by setting the transmission schedule time, it is possible to control transmission intervals of the packets that the peripheral device driver module 402 of the isochronous device transmits collectively upon starting the operation, thereby achieving the effect of reducing the amount of packet buffers 314 that the peripheral device server 306 has, as discussed hereafter in connection with FIG. 17, for instance.

Isochronous Data Reception (Isochronous IN)

Next, embodiments involving isochronous IN communication will be described. Since the isochronous IN procedure has many points in common with those in the isochronous OUT procedure described above, it will be described focusing mainly on differences.

Figure 2:
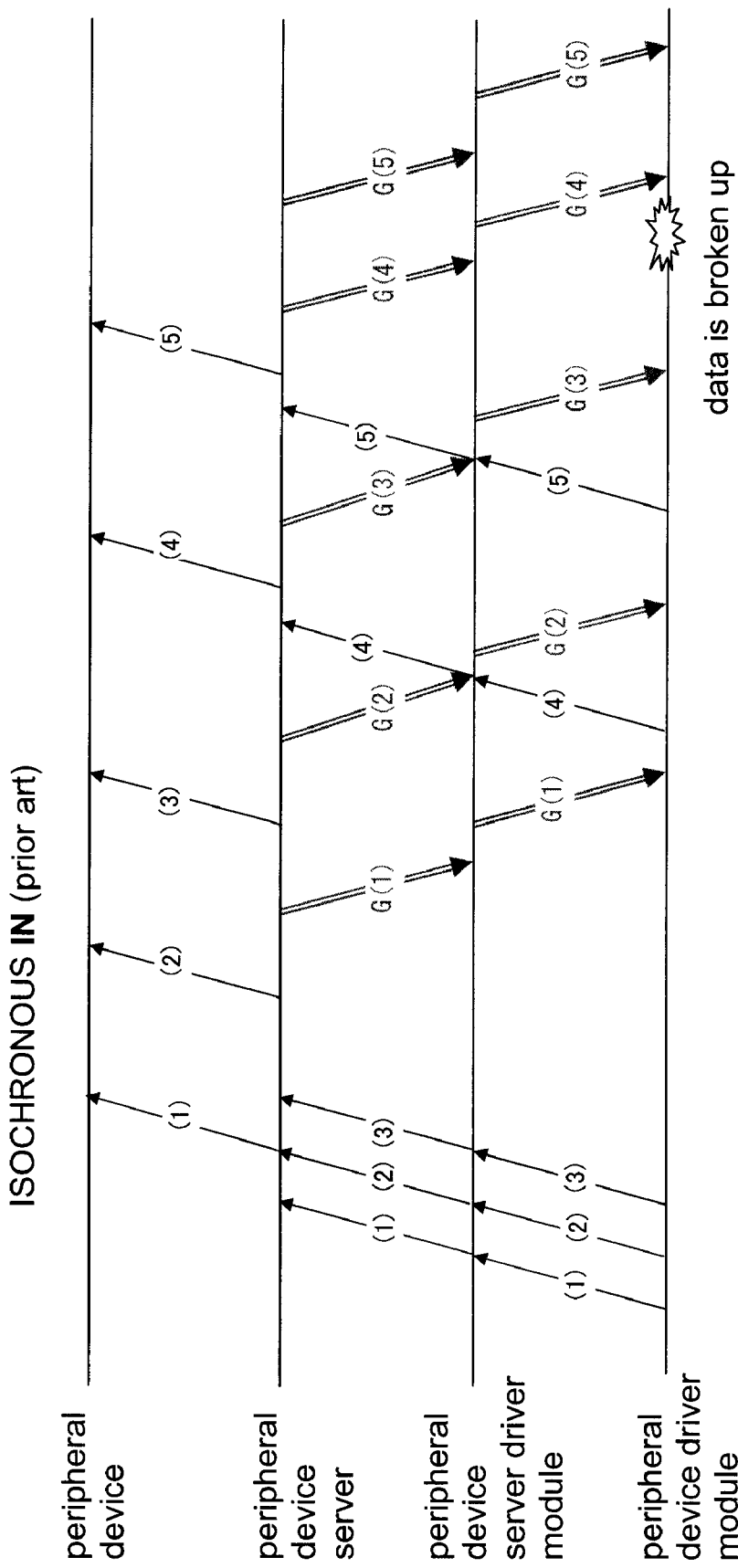
FIG. 2 is another communication sequence diagram illustrating USB communication over a network in a conventional system, namely, a conventional isochronous IN communication sequence.
Figure 11:
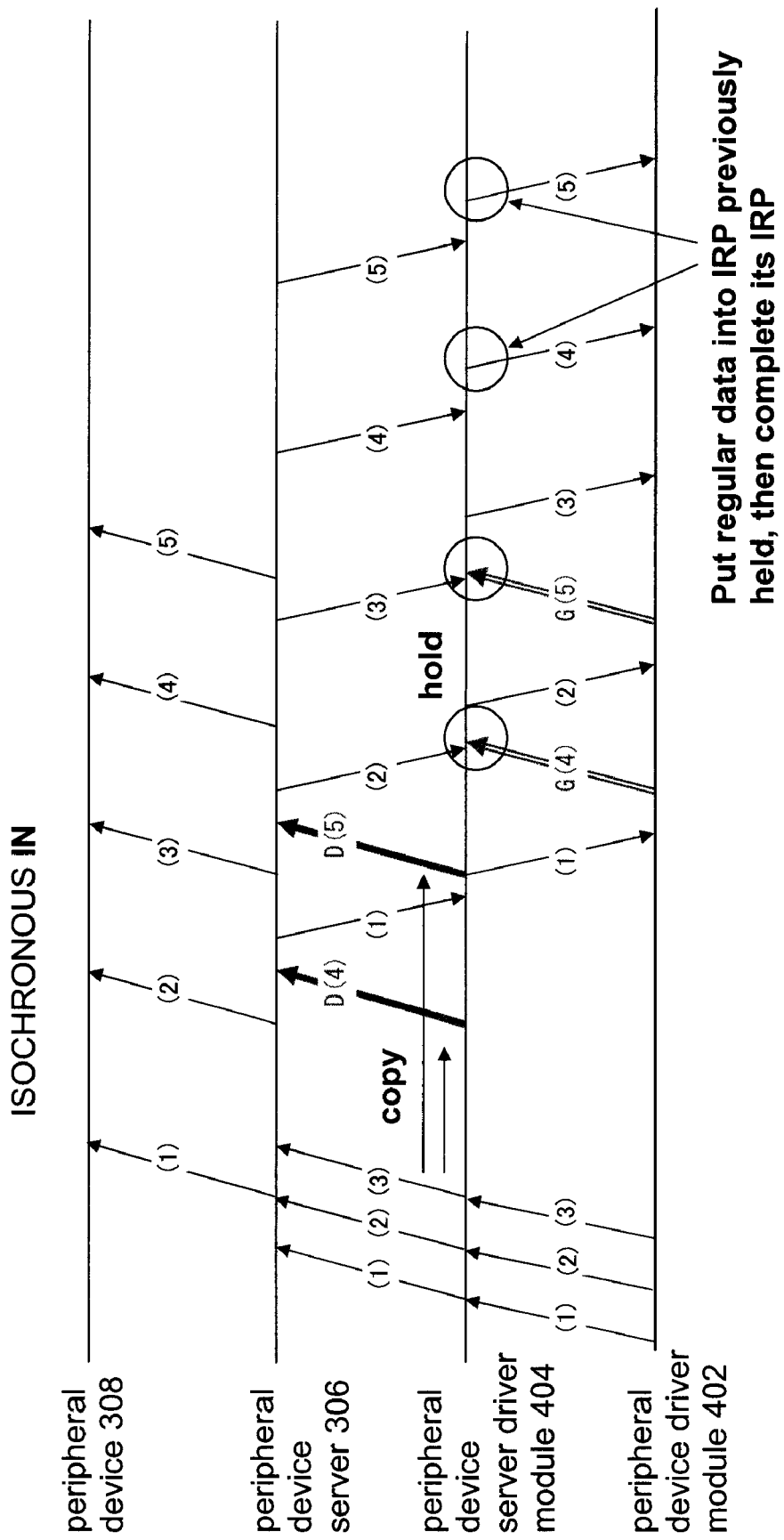
FIG. 11 is a communication sequence diagram illustrating USB isochronous IN communication over a network in a system according to the present invention.
Figure 12:
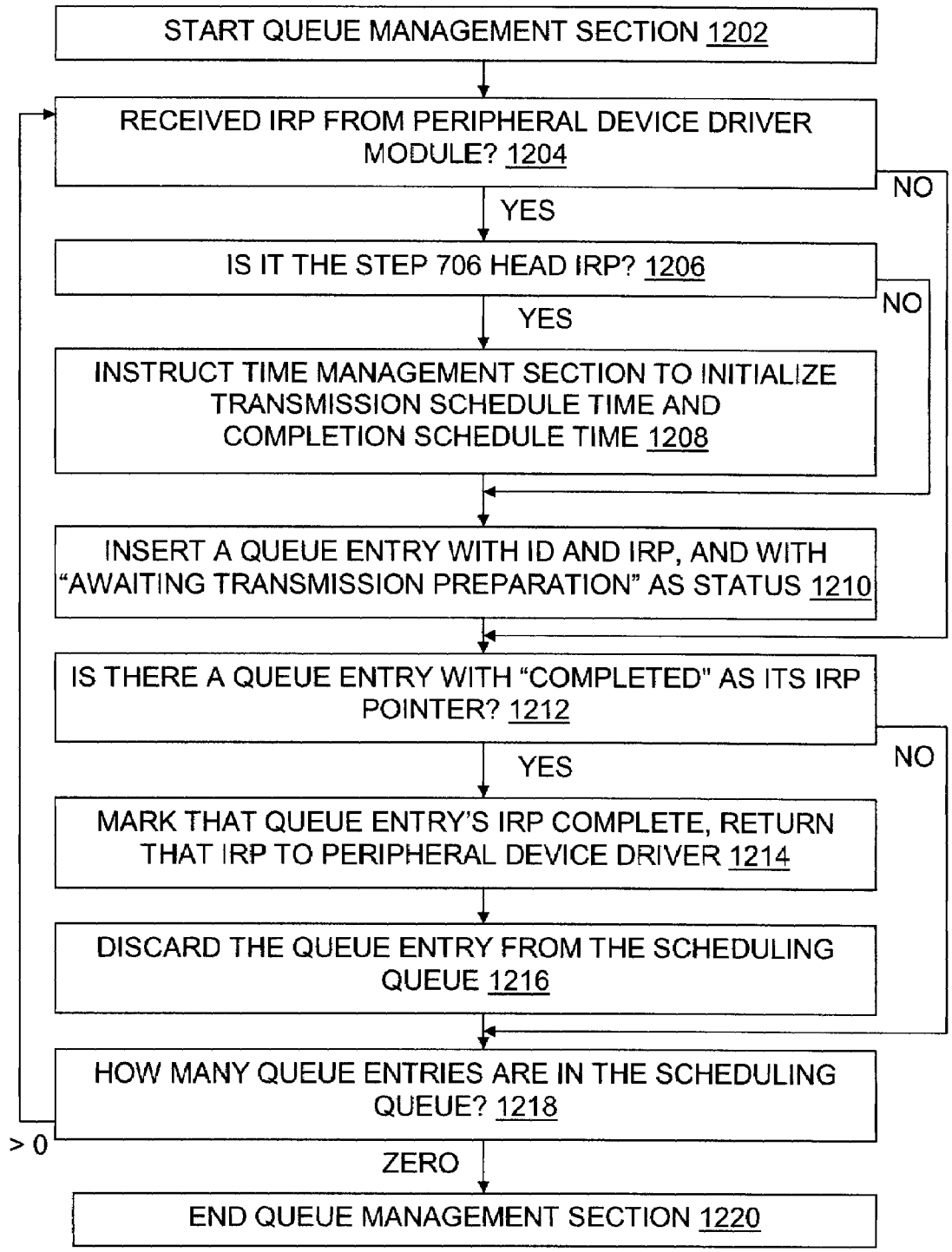
FIG. 12 is a flowchart illustrating operation of a queue management section according to the present invention, such as the queue management section shown in FIG. 4, for managing a queue such as the queue shown in FIG. 5, during isochronous IN communication.
Figure 13:
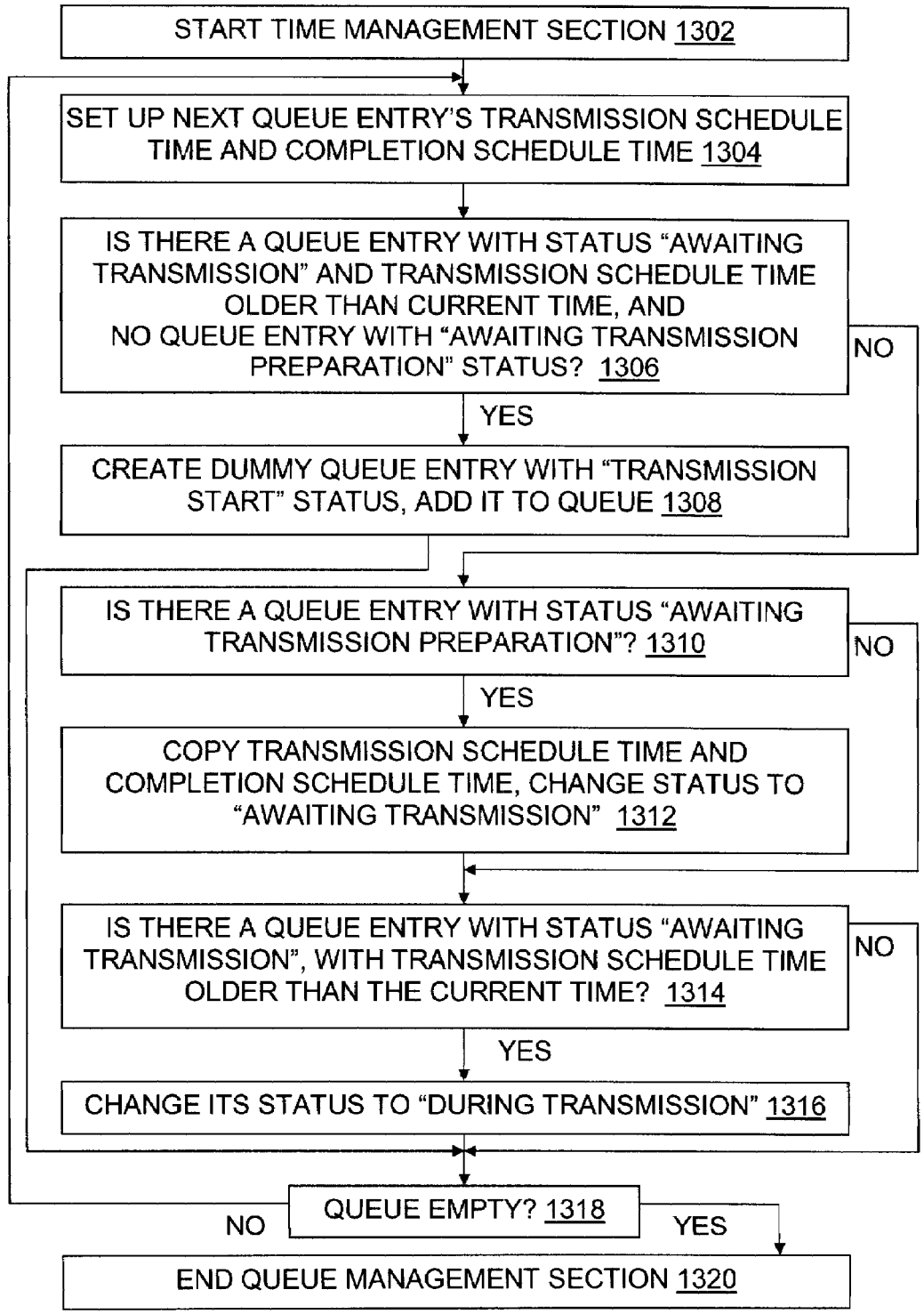
FIG. 13 is a flowchart illustrating operation of a time management section according to the present invention, such as the time management section shown in FIG. 4, during isochronous IN communication.
Figure 14:
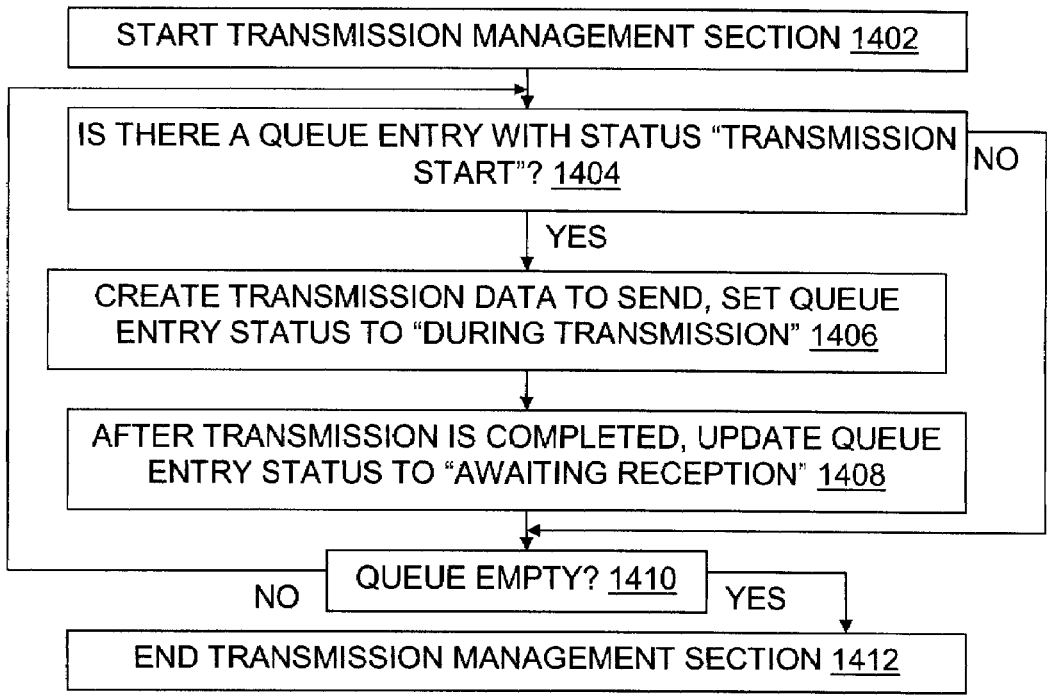
FIG. 14 is a flowchart illustrating operation of a transmission management section according to the present invention, such as the transmission management section shown in FIG. 4, during isochronous IN communication.
Figure 15:
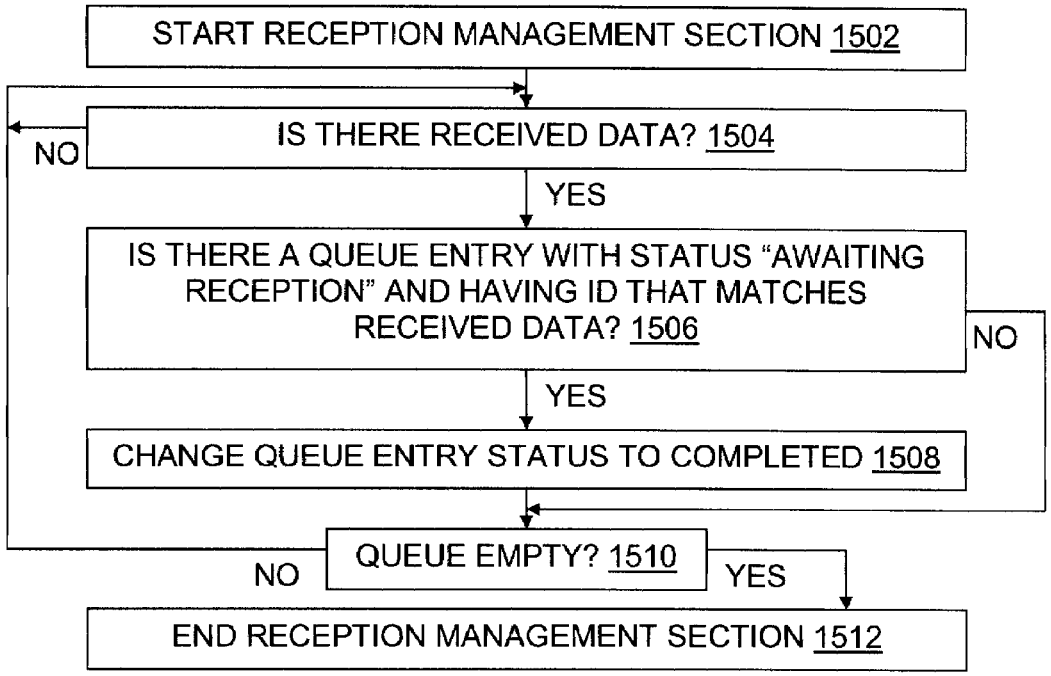
FIG. 15 is a flowchart illustrating operation of a reception management section according to the present invention, such as the reception management section shown in FIG. 4, during isochronous IN communication.

Comparison of FIG. 11 with FIG. 2, which shows the conventional art, may be instructive. Similar to the isochronous OUT communications described above, a main cause of the delay in the case of the isochronous IN is also the delay of the IRP issuance from the peripheral device driver module 402. While the IRP is completed at the completion schedule time in the isochronous OUT embodiments in order to reduce or solve this problem, it is reduced or solved in the isochronous IN embodiments by issuing the IRP at the transmission schedule time. This reflects data flow directions in the isochronous IN and isochronous OUT communications. As a general matter, in similarity with the isochronous OUT communications, it is also possible in the isochronous IN communications to cause the peripheral device driver module 402 to issue the next IRP by completing the IRP previously sent. In this method, however, when completing the previous IRP, there is no data to be returned to the peripheral device driver module 402, namely, the reception data (a.k.a. Received data) from the peripheral device 308, so that the IRP will be completed with empty data or another indication that the data is to be ignored. This is because the data in the communication of the isochronous IN flows in the direction from the peripheral device 308 to the peripheral device driver module 402.

Accordingly, some embodiments of the present invention reduce or prevent the delay by performing the following processing. FIG. 11 illustrates a communication sequence for isochronous IN within an embodiment of the present invention. Characteristic operations according to the present invention involve frames D(4) and D(5), in this example. The peripheral device server driver module 404 issues the dummy frames D(4) and D(5) without waiting for the issuance of the IRP from the peripheral device driver module 402, so that the data of the isochronous IN (frames (4) and (5)) corresponding thereto can be received by the peripheral device driver module 402 without any delay.

At this time, the request for reception data included in the frames D(4) and D(5) utilizes the copy of the request in the regular frame which has been lastly transmitted, namely, the frame (3) in this case. So in this case, frames D(4) and D(5) are both copies of the frame (3). At the point of issuance of frame D(5), the frame (3) issued by peripheral device server driver module 404 is the latest IRP that has been issued actually. In other words, if the IRP is issued by peripheral device driver module 402 and then the frame corresponding to its IRP is issued by peripheral device server driver module 404 between frame D(4) and D(5), this frame is the latest frame that should be copied to the frame D(5). The reason why only the latest frame always should be copied is that such frame is assumed to contain a valid request to be processed on peripheral device 308.

Meanwhile, since the peripheral device driver module 402 does not recognize that the peripheral device server driver module 404 has virtually issued the frames (as opposed to forwarding data from a frame sent by the peripheral device driver module 402), peripheral device driver module 402 issues the regular IRPs, namely, the frames G(4), and G(5), as usual. The peripheral device server driver module 404 which has received these IRPs G(4) and G(5) holds them, and when the data is received from the peripheral device server 306, peripheral device server driver module 404 adds that data into the IRP(s) previously held, to then complete the IRP(s) and then return that data to the peripheral device driver module 402.

Referring now to FIGS. 12 through 15, the functions of the respective management sections and a process flow of the whole isochronous IN procedure will be described.

Queue Management Section. Steps 1204 to 1212 are similar to those of the isochronous OUT procedure. If there is a completed queue entry at step 1212, the queue management section 406 completes the corresponding IRP, and returns the IRP to the peripheral device driver module 402 at step 1214. Subsequently, the queue entry which includes the corresponding IRP is deleted at step 1216. At this time, the reception data is passed to the peripheral device driver module 402. Meanwhile, if there is no completed queue entry at step 1212, the procedure proceeds to step 1218. At step 1218, the queue management section counts the number of the queues entries remaining in the queue list, or at least checks to see if any remain, without necessarily counting them all if several do remain. If there is at least one queue entry remaining, the procedure returns to step 1204 to continue the processing, and if not it is terminated, at least for this iteration.

Time Management Section. At step 1304, the time management section 408 sets the completion schedule time and the transmission schedule time of the queue in a manner similar to that in the isochronous OUT procedure. At step 1306, the time management section 408 checks whether or not there remains a queue entry which (i) has the transmission schedule time (previously set) before the current time, and (ii) also waits for transmission preparation. By setting the transmission schedule time, even when there is no IRP from the peripheral device driver module 402, the peripheral device server driver module 404 can forcibly transmit the request to the peripheral device server 306 when the specified time comes. At step 1306, if the queue entry remains, the time management section 408 copies the data which serves as the request of the reception data from the regular queue entry which has been transmitted previously to thereby create the dummy queue entry (e.g., for D(4) in FIG. 11), and sets the status thereof to the transmission start status and then adds 1308 it to the queue list 414. Subsequently, the procedure proceeds to step 1318. Meanwhile, if there is no such specified queue entry at step 1306, the procedure proceeds to step 1310 to carry out the usual transmission flow. At step 1310, the time management section 408 checks whether or not there is a queue entry waiting for transmission preparation. If there is such a queue entry it sets the transmission schedule time and the completion schedule time, which have been prepared at step 1304, into the queue entry and after changing the queue entry's status to wait for transmission, the procedure proceeds to step 1314. Meanwhile, if there is no such queue at step 1310, the procedure proceeds also to step 1314. At step 1314, the time management section 408 checks whether or not there is a queue entry waiting for transmission older than the current time, and then if there is, the status of the correspondent queue entry is changed to the transmission start status at step 1316 and the procedure then proceeds to step 1318, and if not, the procedure proceeds also to step 1318. Step 1318 is similar to that of the isochronous OUT procedure (step 820).

Transmission Management Section. The transmission management section is similar to that of the isochronous OUT information provided elsewhere herein.

above operating in cooperation with each other. Specifically, the first IRP received by the queue management section 406 from the peripheral device driver module 402 triggers the operation start, and thereafter the statuses of the IRPs registered in the queue list 414 change in sequence, so that the processing proceeds. FIGS. 12 through 15 may be referred to for the relation of the respective management sections in the isochronous IN procedure. Table 2 also illustrates procedure flow, with the rows of the table representing steps related to status change; these steps are extracted from FIGS. 12-15, and hence Table 2 refers to step numbers in those Figures. The step numbers in Table 2 indicate points in the execution of an indicated management section at which a condition checked by another management section has been satisfied. The rows of Table 2 are generally in sequence, but two rows which each pertain to the time management section with status start transmission are parallel; each can be followed by transmission management section row with status "during transmission". With step renumbering in mind, one may refer to sheet 21/24 of the priority provisional application.

TABLE 2

Isochronous IN Queue status transitions

| Management Section | Transition Trigger | Status | Step |
|---|---|---|---|
| Queue Management 406 | Receive the IRP from peripheral device driver module 402 | Waiting for transmission preparation | 1210 |
| Time Management 408 | Existence of queue element with "waiting for transmission preparation" status | Awaiting transmission | 1312 |
| Time Management 408 | Existence of queue element with "awaiting transmission" status, and the current time has run over the transmission schedule time of that queue element, OR | Transmission start | 1316 |
| Time Management 408 | The current time has run over the transmission schedule time of the queue element, and the queue element with "awaiting transmission" status does not remain in the queue | Transmission start | 1308 |
| Transmission Management 410 | Existence of queue element with "transmission start" status | During transmission | 1406 |
| Transmission Management 410 | Completion of the transmission | Awaiting reception | 1408 |
| Reception Management 412 | Existence of received data, and existence of queue element having "awaiting reception" status | Completed | 1508 |
| Queue Management 406 | Existence of queue element with "completed" status | (discard the queue element) | 1216 |

Reception Management Section. Steps 1504 and 1506 are similar to those of the isochronous OUT procedure. If there is any correspondent queue entry at step 1506, the reception management section 412 changes the status of this queue entry to completed at step 1508. This part is different from the case of the isochronous OUT. Namely, since it is necessary to return the received data to the peripheral device driver module 402 in the isochronous IN communication, the reception management section does not delete the queue entry, and the procedure then proceeds to step 1510. Meanwhile, if there is no correspondent queue entry at step 1506, the procedure proceeds also to step 1510. Step 1510 is similar to that of the isochronous OUT procedure.

Flow. The isochronous communication (both IN and OUT) is achieved by the respective management sections described In the underlying provisional application, condition satisfaction points are indicated on sheet 16/24 of the drawings. Using the present document's step numbering, the condition satisfaction points shown in that provisional drawing are as follows: By step 1208 of the queue management section, execution of the time management section beginning at step 1302 is triggered. By step 1308 or step 1316 of the time management section, execution of the transmission management section at step 1404 is triggered. By step 1408 of the transmission management section, execution of the reception management section at step 1506 is triggered. By step 1508 of the reception management section, execution of the queue management section at step 1212 is triggered.

Referring to FIGS. 12 through 15 and to Table 2, steps 1210 to 1406 are similar to those of isochronous OUT procedure.

Step 1308 is a characteristic operation for the isochronous IN communication within some embodiments. At the time management section 408, if the current time has run over the transmission schedule time, the data of the regular IRP which has been transmitted previously is copied to create the transmission start queue entry even when there is no queue entry with a status of waiting for transmission preparation (step 1308). In the transmission management section 410, if there is a transmission start queue entry, its status is changed to a status of during transmission, and when the transmission is completed, it will be changed to a status of waiting for reception (step 1408). In the reception management section 412, the data is received from the peripheral device server 306, and then if the ID included in the data and the ID of a queue entry that is waiting for reception match with each other, the entry's status is changed to completion status (step 1508). In the queue management section 406, if there is a completed queue entry, the received data is added to the IRP of this queue entry for completion and the queue entry is deleted (step 1216).

Some Effects. According to this method, the number and timing to receive the isochronous data (isochronous IN) can be adjusted by setting the transmission schedule time and the completion schedule time for the queue entries. Namely, by setting the transmission schedule time and forcibly transmitting the request from the peripheral device server driver module 404, the request even for the IRP which is not issued yet can be transmitted to the peripheral device 308. In addition, by setting the completion schedule time, the IRP can be forcibly completed, e.g., in the case where the response is degraded due to abnormalities in the network or the like. Thereby, it is possible to help prevent the peripheral device driver module 402 from falling into an abnormal condition, such as a time-out or the like.

Time Synchronization Embodiments

Figure 16:
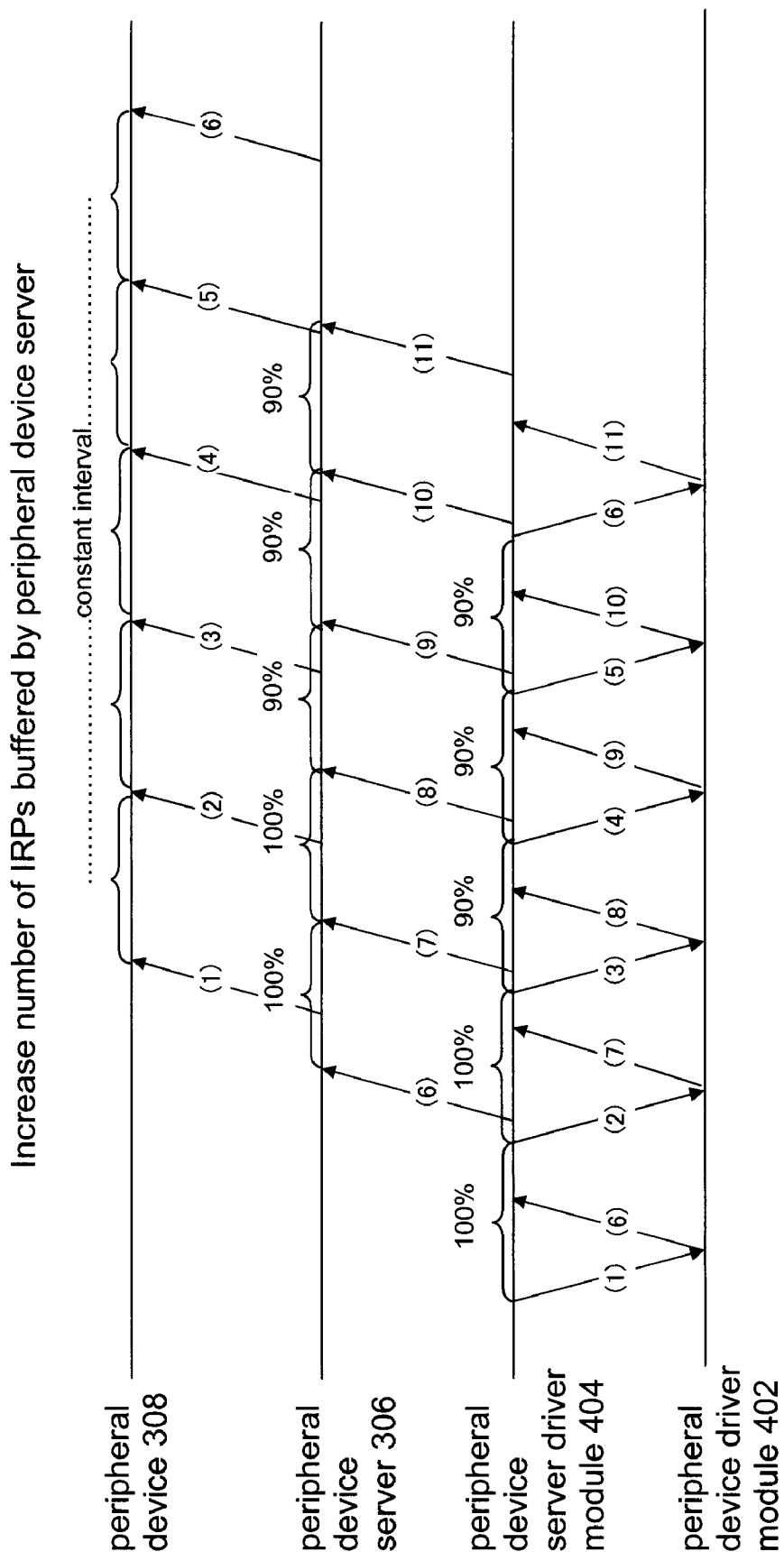
FIG. 16 is a communication sequence diagram illustrating USB isochronous communication over a network in a system according to the present invention, with an increased number of IRPs buffered at a peripheral device server.
Figure 17:
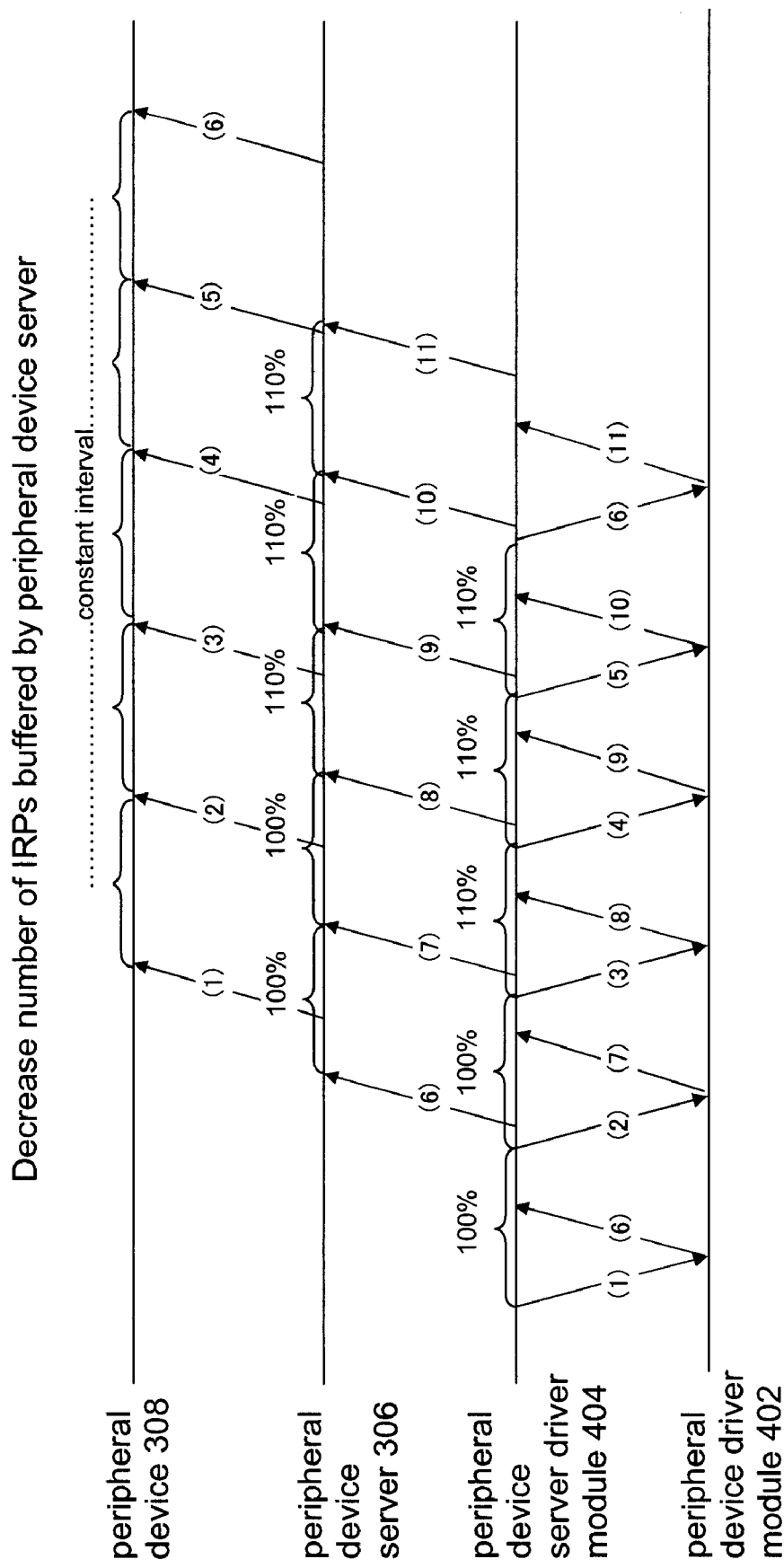
FIG. 17 is a communication sequence diagram illustrating USB isochronous communication over a network in a system according to the present invention, with a decreased number of IRPs buffered at a peripheral device server.

Another set of embodiments will now be described, which add a method for achieving a time synchronization of the isochronous data communication to the first embodiments described above. In order to achieve this purpose, the following two requirements are now presumed. One is to transmit the data consistently at some constant interval from the peripheral device server 306 to the peripheral device 308. The other is to provide the peripheral device server 306 with adequate buffer space 314 for the IRPs. As a result of these presumptions, the peripheral device server driver module 404 can maintain the synchronization of the IRP transmission in accordance with the timing of the peripheral device server 306. Moreover, even when the response is degraded, such as by abnormalities of network traffic, the data can be transmitted to the peripheral device server 306 at the constant interval. As is normal in the industry, "constant" means "within an acceptable and measurable tolerance". FIGS. 16 and 17 illustrate two patterns for achieving the above-mentioned purpose in isochronous OUT mode. As for isochronous IN mode, a similar mechanism, as described below, can be used.

In order to maintain the transmission of the IRP from the peripheral device server 306 consistently at the constant interval, the number of the IRPs to be buffered 314 by the peripheral device server 306 should also be maintained at or near a fixed quantity within a predetermined range.

FIG. 16 illustrates a case where the response from the peripheral device 308 is upgraded, e.g., when the traffic is improved by being increased rapidly. The number of the IRPs to be buffered by the peripheral device server 306 is increased due to an improvement of the response. At this time, by reducing the extended time interval for the IRP completion from the peripheral device server driver module 404 to the peripheral device driver module 402 and increasing the number of IRP transmissions, the number of the IRPs to be buffered 314 by the peripheral device server 306 can be increased. Assume that the time interval for the peripheral device server driver module 404 to complete the IRPs of the frames (1), (2), and (3) is 100%, and the time interval of the frames (3), (4), (5), and (6) is 90%. That is, if the interval from (1) to (2) is 100%, then the interval from (3) to (4) is 90%, and so on. Since the peripheral device driver module 402 issues the subsequent IRPs (frames (6) to (11)) with the time interval equivalent to this, the frames which arrive at the peripheral device server 306 are also received at the timing equivalent to this. Meanwhile, since the time interval of the frame transmitted from the peripheral device server 306 to the peripheral device 308 is treated as constant, the number of the IRPs to be buffered by the peripheral device server 306 can be increased by reducing the time interval as described above. By carrying out approaches like this, the isochronism between the peripheral device driver module 402 and the peripheral device 308 can be secured even when the traffic is improved rapidly.

FIG. 17 illustrates a case where the response from the peripheral devices 308 tends to delay due to causes such as the degradation in the response of the traffic. In such a case, it may be helpful to delay the issue of the IRP from the peripheral device driver module 402 to some extent. The time interval of the IRP issued by the peripheral device driver module 402 is determined (or at least influenced) by the time interval of the IRP which the peripheral device server driver module 404 completes, so that when the time interval of completing the IRP is extended, the time interval of issuing the IRP from the peripheral device driver module 402 is extended accordingly. By utilizing the illustrated relationship in a mechanism (code and/or circuitry), the time interval of issuing the IRP of the peripheral device driver module 402 can be controlled from the peripheral device server driver module 404. In the example illustrated in FIG. 17, where it is assumed that the time interval for the peripheral device server driver module 404 to complete the IRPs of the frames (1), (2), and (3) is 100%, the time interval of the frames (3), (4), (5), and (6) is 110%. Since the peripheral device driver module 402 issues the subsequent IRPs (frames (6) to (11)) with the time interval equivalent to this, the frames which arrive at the peripheral device server 306 are also received at the timing equivalent to this. Meanwhile, since the time interval of the frame transmitted from the peripheral device server 306 to the peripheral device 308 is constant, the number of the IRPs to be buffered in the buffer 314 by the peripheral device server 306 is decreased by the change in time interval from 100% to 110%. In isochronous OUT mode, the number of transmitted IRPs buffered at peripheral device server 306 can be managed by changing the time interval in which to complete IRPs. But in isochronous IN mode, the peripheral device server driver module 404 only has to manage the time interval of IRPs issued from the peripheral device server driver module 404 to the peripheral device server 306 in order to maintain the isochronism. So, by merely changing that interval as taught herein, the isochronism of isochronous OUT mode can be secured. By carrying out such an approach, the isochronism between the peripheral device driver module 402 and the peripheral device 308 can be secured even when the traffic response is temporarily degraded.

In any of the cases described above, the peripheral device server driver module 404 manages the number of the transmitted IRPs, so that the number of the IRPs to be buffered 314 by the peripheral device server 306 can always be grasped, and the time interval of the IRP completion is determined dynamically based on the number.

As can be understood from above, the timing for issuing the IRP from the peripheral device driver module 402 is controlled by adjusting the timing for the IRP completion by the peripheral device server driver module 404, thus making it possible for the peripheral device server driver module 404 to synchronize with the IRP transmission in accordance with the time of the peripheral device server 306. Note herein that margins of increase/decrease of the time interval of the IRP completion illustrated in this embodiment are just for an example and any values may be set.

Delay Control Embodiments

In this next set of embodiments, delay control is added to at least one of the embodiments described above. The data transmission via the network, not only via the peripheral device server, is likely to cause the delay due to the network response, namely, the network traffic, or various other reasons. In this regard, the delay control can be said to be an important, if not indispensable, function for network software and hardware. The delay control is also important in a system in which the peripheral devices are shared as illustrated in the present disclosure. This is because the peripheral device driver module 402 used in the present invention is typically software designed to be used while being directly connected to the PC, and is not equipped with software which is specifically considered with regard to the degradation in the response. In other words, since the peripheral device driver module 402 is often designed under the assumption to be used in a local connection which hardly causes delay, it may cause a fatal state (for example, the PC or the peripheral device driver module 402 may freeze) when the delay occurs. If such a situation occurs frequently, the system would be less reliable. In this regard, there is described below an approach which incorporates delay control to deal with the degradation in response or the like.

Figure 18:
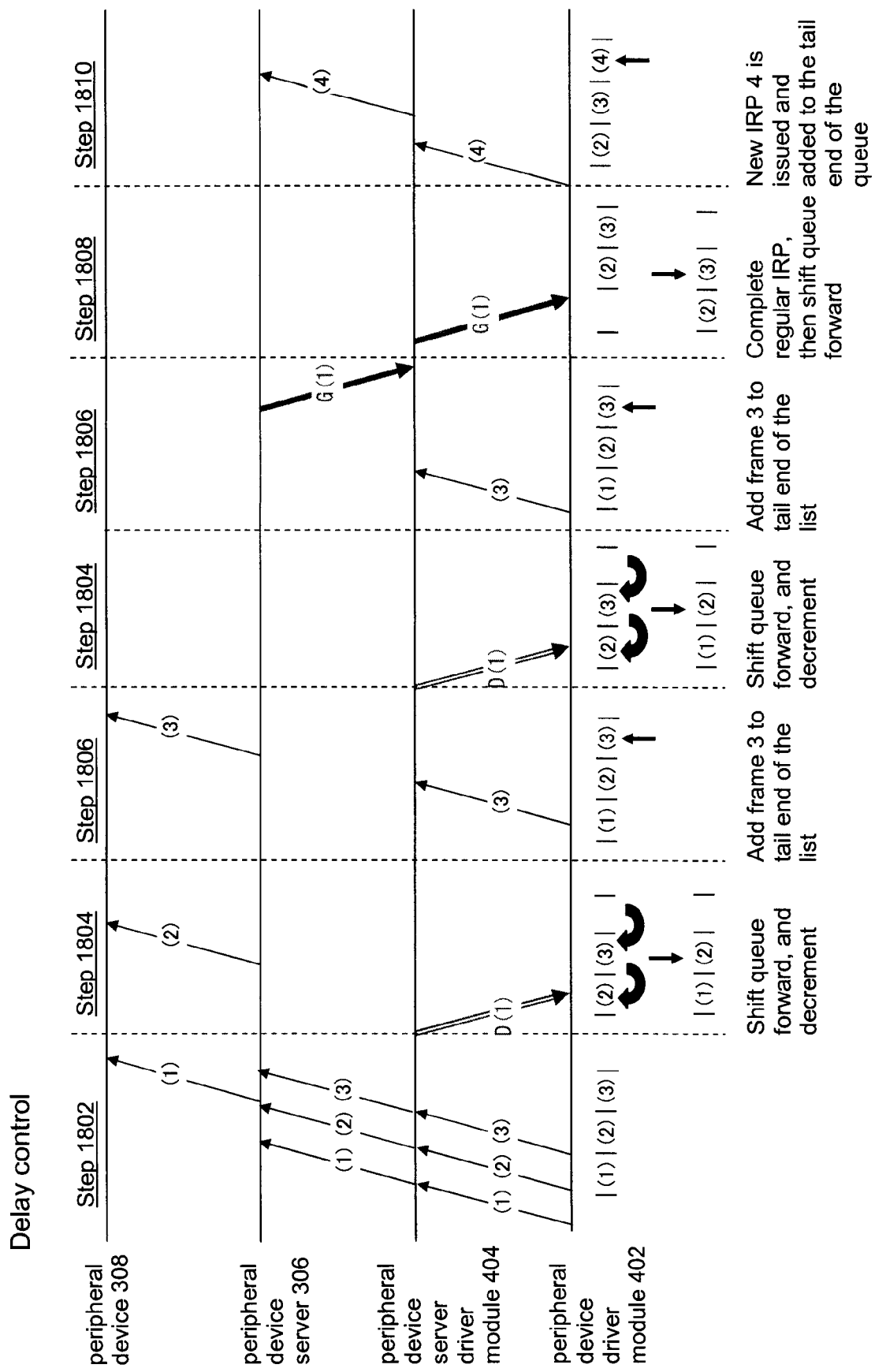
FIG. 18 is a communication sequence diagram illustrating USB isochronous communication over a network in a system according to the present invention, with a delay control.

FIG. 18 illustrates a sequence when the delay occurs in the response from the peripheral device 308 and illustrates contents of the queue list 414 that have been sent. Referring to this figure, in a system without delay control, after the frames (1), (2), and (3) are transmitted from the peripheral device driver module 402 and the peripheral device server driver module 404, the response of the IRP is not returned to the peripheral device driver module 402 until the peripheral device server driver module 404 completes the regular (non delay-controlled) IRP, as indicated by frame G(1) at step 1808. In such a case, since the peripheral device driver module 402 cannot receive anything after issuing the frames (1), (2), and (3) before receiving the frame G(1), a time-out occurs.

Accordingly, the present delay control embodiments are presented. By the peripheral device server driver module 404 forcibly completing the IRP (as indicated by frame D(1)) when the specified time comes, and thus causing the peripheral device driver module 402 to issue the next IRP, this delay controlled embodiment avoids having the peripheral device driver module 402 shift into time-out processing. Specifically, when the number of the transmitted IRPs managed by the peripheral device server driver module 404 exceeds a predetermined number, all the frame numbers of the transmitted IRPs are decremented by one when the next IRP is completed to thereby make an empty space in the last IRP queue position (step 1804). Subsequently, the IRP (frame (3)) newly issued by the peripheral device driver module 402 is put into the tail end of this empty IRP queue entry and the status thereof is changed to the during transmission status (step 1806). However, this IRP does not get transmitted to the peripheral device server 306. This is because the response from the peripheral device server 306 is already delayed at this point, and cannot be obtained even when the IRP is transmitted. While this processing (the queue manipulation in steps 1804, 1806) is repeated twice in the illustrative FIG. 18, such processing can be repeatedly performed zero or more times until the regular response is returned.

As described above, by the peripheral device server driver module 404 rotating the queues while emptying them and continuing the pseudo-processing, the peripheral device driver module 402 recognizes that a certain response is obtained, thus making it possible to avoid shifting the peripheral device driver module 402 into time-out processing. Thereafter, when the regular response (frame G(1)) is obtained from the peripheral device server 306, the peripheral device server driver module 404 completes this IRP, and the queues are shifted frontward by one position (step 1808). At this time, the frame numbers are left as they are. Subsequently, the new IRP (frame (4)) is issued from the peripheral device driver module 402, and the frame (4) is added to the tail end of the sent queue list 414 when the transmission of this IRP is completed (step 1810). With such a queue management method of delay control, the isochronism can be secured for the peripheral device driver module 402 on the PC side even when a temporary degradation in the response of the network occurs.

FIG. 18 shows a sequence of delay control for both isochronous OUT and isochronous IN transmissions. The difference between them is in data retained in the IRP. In isochronous OUT mode, data of isochronous OUT communication is retained step 1806 in an IRP (frame (3)) which is issued corresponding to the forcibly completed IRP (frame D(1)). On the other hand, in isochronous IN mode, data of isochronous IN communication is retained in the forcibly completed IRP (frame D(1)). In this case, the data to be retained is not actually received from peripheral device server 306, so that peripheral device server driver module completes the IRP by putting null data or dummy data into the IRP.

Next, steps for entering into delay control in isochronous IN communication according to some embodiments of the invention will be described using FIG. 19. The number of transmitted IRPs is counted 1919. If the number of transmitted IRPs exceeds 1920 a threshold, then a dummy communication is created 1922 and sent 1924 to the peripheral device driver 402. The threshold used in step 1920 can be determined by trial and error, with the selected threshold being such that an isochronous sequence of communication transmissions toward the peripheral device can be maintained. If the candidate threshold is too small, the delay control mode starts too early, namely, when communication goes normally. In response to the delay control dummy communication, the peripheral device driver 402 sends a communication, which is received 1926 and then added 1928 to the scheduling queue 414. The frame number used by the management sections 406, 408, 410, 412 is shifted forward, as also illustrated in FIG. 18. As indicated by steps 2019 and 2020, similar delay control 416 may also be used during isochronous OUT communication.

Note that the dummy in step 1922 is from peripheral device server driver module 404 to peripheral device driver module 402, being related to the delay control in FIG. 18, while the dummy in step 1908 is a copy of the regular frame which has been lastly transmitted from peripheral device driver module 402 to peripheral device server 306 as shown in FIG. 11. Various kinds of dummy communication(s) 312 may be used as follows. First, in isochronous IN mode, a "normal" (that is, not in delay control mode) dummy (e.g., D(4) and D(5) in FIG. 11) may be sent from a peripheral device server driver module 404 to a peripheral device server 306; this dummy communication is a copy of the frame that has been lastly transmitted. Second, a dummy communication used in delay control mode (e.g., D(1) in FIG. 18) may be sent from a peripheral device server driver module 404 to a peripheral device driver module 402; this dummy is null data, for example, STATUS_SUCCESS that has been explained before. Third and fourth, in isochronous OUT mode, a normal dummy (e.g., D(1) and D(2) in FIG. 6) and/or a delay control mode dummy (e.g., D(1) in FIG. 18), respectively, may be used. In these third and fourth cases, the dummy communication is sent from a peripheral device server driver module 404 to a peripheral device driver module 402, and is null data, for example, ERROR which does not immediately cause time-out mode in isochronous transmission.

Additional Remarks

Figure 19:
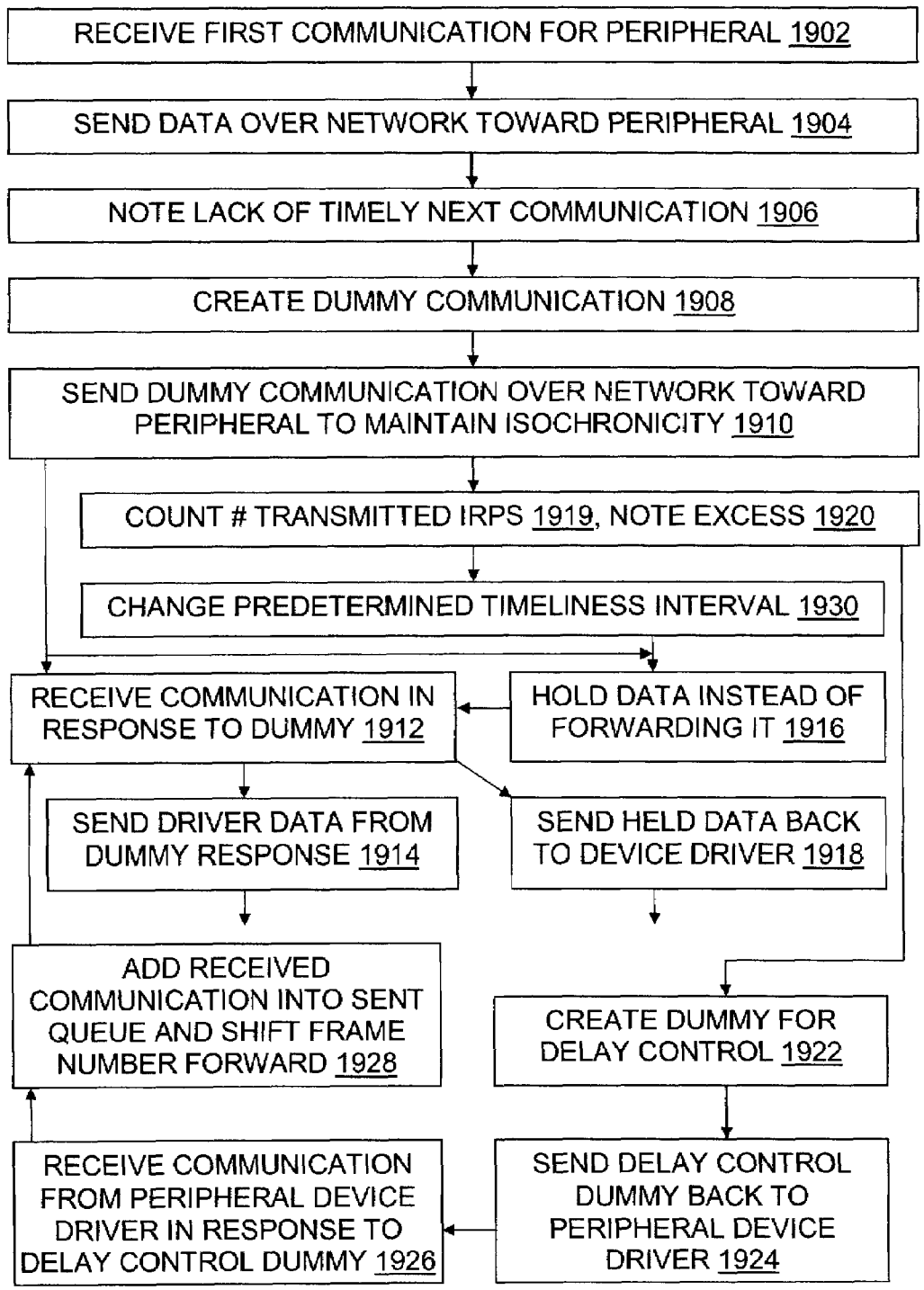
FIG. 19 is a flowchart further illustrating operation of an embodiment of the present invention during isochronous IN communication.

Bearing in mind the discussion above, it will be understood that some embodiments of the present invention provide a method of facilitating isochronous IN communication as in FIG. 11, including steps illustrated in FIG. 19, namely: receiving 1902 from a peripheral device driver a first communication 310 (such as frame 2 in FIG. 11) for a peripheral device; sending 1904 data from the first communication over a network toward the peripheral device; noting 1906 passage of a predetermined interval without receipt of a second communication 310 from the peripheral device driver; and then creating 1908 a dummy communication 312 (such as D(4) in FIG. 11) and sending 1910 it over the network toward the peripheral device, thereby maintaining an isochronous sequence of communication transmissions toward the peripheral device. As to step 1906, the amount of time that has passed without a regular communication 310 will vary according to the particular implementation and configuration, but is long enough that the invention needs to now produce a dummy communication 312, to prevent the driver from going into a time-out mode. In some embodiments, the creating step 1908 copies, into the dummy communication 312, data from the communication that was most recently received from the peripheral device driver; for instance, creating step 1908 may copy from frame (3) to D(4) as shown in FIG. 11.

It will be understood that the invention includes methods involving a single peripheral device and also includes methods involving more than one peripheral device, in that "a" or "one" means "at least one". In some embodiments, the receiving step 1902 receives communications from a USB peripheral device driver, and the sending step 1904 sends data toward a USB peripheral device.

In some embodiments, the method further includes: receiving 1912 over the network a responsive communication 310 which responds to the dummy communication 312 (such as frame (4) at the right end of FIG. 11, when its data is sent on from the peripheral device server driver module to the peripheral device driver module); and sending 1914 data from the responsive communication to the peripheral device driver.

In some embodiments, and with reference to FIGS. 11 and 19, the method further includes: holding 1916 within a peripheral device server driver module data from a peripheral device driver module instead of forwarding that data to a remote peripheral device; and then sending 1918 the held data back to the peripheral device driver module after receiving 1912, 1902 a communication from the peripheral device in response to data that was forwarded. The "data" referenced in the phrase "in response to data that was forwarded" is not the same data referred to by the preceding three uses of the word "data", because only the last "data" is a dummy one, that is, one corresponding to content in a dummy communication 312. Thus, in isochronous IN mode, data included in the real communication 310 from the peripheral device driver module (e.g., G(4) in FIG. 11) is held in the peripheral device server driver module and is sent back to the peripheral device driver module after receiving communication from the peripheral device server.

In some embodiments, communications sent over the network are buffered at a peripheral device server, and the method further includes Time Synchronization implemented by changing 1930 the predetermined interval that is used to trigger dummy communications 312, thereby changing the number of communications which are buffered. For instance, the interval may be changed 1930 to 90% of its previous value, or to 110% of its previous value, as illustrated in FIGS. 16 and 17, respectively. Changing the predetermined interval of communications may be desired in order to optimize the buffered memory volume in the peripheral device server, for example.

Steps 1919 through 1928 of FIG. 19 further illustrate a form of delay control 416 used during isochronous IN communication according to some embodiments of the invention. The number of transmitted IRPs is counted 1919. If the number of transmitted IRPs exceeds 1920 a threshold, then a dummy communication is created 1922 and sent 1924 to the peripheral device driver 402. The threshold used in step 1920 can be determined by trial and error, with the selected threshold being such that an isochronous sequence of communication transmissions toward the peripheral device can be maintained. If the candidate threshold is too small, the delay control mode starts too early, namely, when communication goes normally. The 1922 branch is taken if the number of transmitted IRPs exceeds the predetermined number, and the 1930 branch is taken if it does not exceed the predetermined number. In response to the delay control dummy communication, the peripheral device driver 402 sends a communication, which is received 1926 and then added 1928 to the scheduling queue 414.

Figure 20:
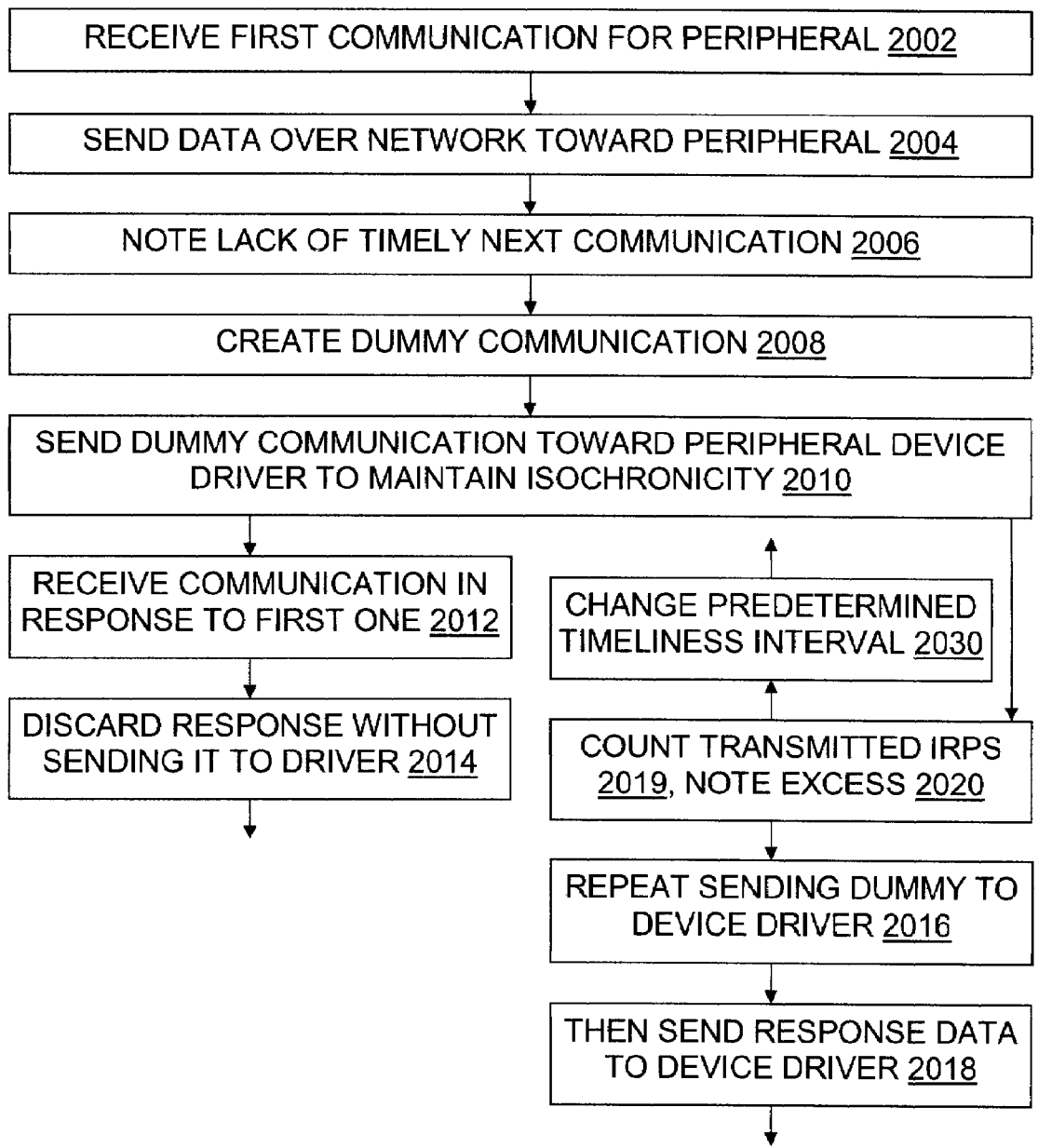
FIG. 20 is a flowchart further illustrating operation of an embodiment of the present invention during isochronous OUT communication.

It will also be understood that some embodiments of the present invention provide a method of facilitating isochronous OUT communication as in FIG. 6, including steps illustrated in FIG. 20, namely: receiving 2002 from a peripheral device driver a first communication 310 for a peripheral device (such as frame (3) in FIG. 6); sending 2004 data from the first communication over a network toward the peripheral device; noting 2006 passage of a predetermined interval without receipt, over the network, of a responsive communication 310 from the peripheral device in response to the first communication; and then creating 2008 a dummy communication 312 (such as frame D(1) in FIG. 6) and sending 2010 it toward the peripheral device driver, thereby maintaining an isochronous sequence of communication transmissions toward the peripheral device driver. In some embodiments, the first communication 310 (the one received in step 2002) includes an I/O Request Packet from the peripheral device driver.

In some embodiments, the method further includes: receiving 2012, over the network and after passage of the predetermined interval, a responsive communication 310 (such as frame G(1) in FIG. 6) which responds to the first communication; and discarding 2014 that responsive communication without sending it to the peripheral device driver.

In some embodiments, the method repeats 2016 at least the step of sending a dummy communication 312 toward the peripheral device driver (such as step 1804), until a responsive communication which responds to the first communication is received; and then sends 2018 data from that responsive communication to the peripheral device driver.

In some embodiments, communications sent over the network are buffered at a peripheral device server, and the method further includes Time Synchronization implemented by changing 2030 the predetermined interval that is used to trigger dummy communications 312, thereby changing the number of communications which are buffered.

In some embodiments, steps 2012 to 2014 correspond to isochronous IN communication such as in FIG. 11, and steps 2010, 2019, 2020, 2016, and 2018 correspond generally to delay controlled communication such as in FIG. 18. Branching at step 2020 depends on whether or not the number of transmitted IRPs (dummy IRPs 312 and/or regular IRPs 310) managed by the peripheral device server driver module 404 exceeds a predetermined number. The 2016 branch is taken if the number of transmitted IRPs exceeds the predetermined number, and the 2030 branch is taken if it does not exceed the predetermined number.

As noted, the invention may be embodied in systems, not merely in methods. Some systems for isochronous communication according to the invention include a peripheral device server driver module 404; and a dummy communication 312 (such as D(4) in FIG. 11 or D(1) in FIG. 6) which is created by the peripheral device server driver module and transmitted from the peripheral device server driver module, thereby maintaining isochronous communication in the absence of a timely communication that was created elsewhere (in a place different from the peripheral device server driver module) and sent to the peripheral device server driver module. Such system embodiments may use methods of the invention for isochronous IN communication, for isochronous OUT communication, or both. But unless expressly indicated otherwise, a given system embodiment operates according to the present inventive methods in both IN and OUT isochronous communications.

In some embodiments, the peripheral device server driver module 404 includes a scheduling queue 414 (as illustrated in the example of FIG. 5) representing isochronous communications, and a management component (e.g., queue management section 406, time management section 408, transmission management section 410, and reception management section 412 or equivalent functionality) for managing the scheduling queue 414.

In some embodiments, the peripheral device server driver module 404 includes a delay control component 416 (as also illustrated the particular example of FIG. 18) for repeatedly creating dummy communications to a peripheral device driver module to prevent the peripheral device driver module from timing out while the peripheral device server driver module waits for a responsive communication to arrive from a peripheral device over a network. As with other modules and components of the system, the delay control component 416 may be implemented in hardware, firmware, software, or some mixture thereof, so long as it provides the functionality specified herein.

In some embodiments, the peripheral device server driver module includes an isochronous IN communication means 420 for helping maintain isochronous IN communication (as in FIG. 11, for instance) from a peripheral device driver module to a peripheral device over a network. This means 420 includes code and/or circuits which have four management sections following the illustrated flowchart of FIG. 1, and also includes any functionally equivalent code for helping maintain isochronous IN communication from a peripheral device driver module to a peripheral device over a network. Functionally equivalent code or circuitry must provide the stated functionality, and may—but need not always—provide other functionality in addition to that required functionality. It is not necessary for functionally equivalent code or circuitry to provide every aspect of such help described herein, but is instead sufficient for it to provide at least one such aspect. "Code" as used herein includes without limitation computer program code or software. "Code" likewise includes instructions to a digital processor and/or data operated on by executing those instructions. The code need not be stored in RAM; it could be in ROM, PROM, EEPROM, an ASIC chip, an FPGA chip, a PAL circuit, etc.

In some embodiments, the peripheral device server driver module includes an isochronous OUT communication means 418 for helping maintain isochronous OUT communication (as in FIG. 6, for instance) from a peripheral device over a network to a peripheral device driver module. This means 418 includes code and/or circuits which have four management sections following the illustrated flowchart of FIG. 6, and also includes any functionally equivalent code for helping maintain isochronous OUT communication from a peripheral device over a network to a peripheral device driver module.

In some embodiments, the system includes a peripheral device server 306. In some, the server 306 has a buffer for holding isochronous communications. Some system embodiments also include one or more means 418, 420 for changing the number of buffered isochronous communications by changing 1930 the interval between isochronous IN communication transmissions and/or by changing 1930 the interval between isochronous OUT communication transmissions. Some possible changes are illustrated in FIGS. 16 and 17, but it will be understood that the particular communication sequences and intervals illustrated in those Figures are merely a few examples of the wider scope of the present invention.

The invention may be embodied in various ways, e.g., processes and/or hardware on a server computer, on a client or peer, on a standalone computer, or on a networked device or appliance, as software (data instructions) in RAM or permanent storage for performing a process, as general purpose computer hardware configured by software, as special-purpose computer hardware, as queues, frames, or other data produced by a process, and so on. The configurations, interactions, frame counts, and other details of the examples provided here are merely illustrations; the invention is not limited to the specific examples given herein.

"Isochronous" and "isosynchronous" are used sometimes interchangeably by some persons; the term "isochronous" is preferred here. But the meaning of this or any other term as made apparent to those of skill in the art from the examples and discussion herein, not the term's definition in some dictionary or in the mind of some third party, should control.

Although particular embodiments of the present invention are expressly illustrated and described herein as methods, for instance, it will be appreciated that discussion of one type of embodiment also generally extends to other embodiment types. For instance, the descriptions of methods—whether by flowchart, by table, and/or by diagram—also help describe systems which perform methods, and descriptions of methods also help describe products (such as queues or a sequence of frames) that are produced by methods. It does not follow that limitations from one embodiment are necessarily read into another. All claims as filed are part of the specification and thus help describe the invention, and repeated claim language may be inserted outside the claims as needed. In the claims a reference to an item generally means at least one such item is present and a reference to a step means at least one instance of the step is performed. Components, steps, and other aspects of different examples given here may be combined to form a given embodiment.

I claim:

1. A method of facilitating isochronous IN communication, comprising:

receiving (1902) from a peripheral device driver (402) a first communication (310) for a peripheral device (308);

sending (1904) data from the first communication over a network (302) toward the peripheral device;

noting (1906) passage of a predetermined interval without receipt of a second communication from the peripheral device driver; and then creating (1908) a dummy communication (312) including the data request and sending (1910) it over the network toward the peripheral device, thereby maintaining an isochronous sequence of communication transmissions toward the peripheral device.

2. The method of claim 1, wherein the receiving step (1902) receives communications from a USB peripheral device driver (402), and the sending step (1904) sends data toward a USB peripheral device (308).

3. The method of claim 1, wherein the method includes receiving (1902) communications for multiple peripheral devices (308).

4. The method of claim 1, wherein the creating step (1908) copies, into the dummy communication (312), data from the communication that was most recently received (1902) from the peripheral device driver (402).

5. The method of claim 1, further comprising the steps of:

receiving (1912), over the network (302), a responsive communication (310) which responds to the dummy communication (312); and sending (1914) data from the responsive communication to the peripheral device driver (402).

6. The method of claim 1, further comprising holding (1916) within a peripheral device server driver module (404) a data request from a peripheral device driver module (402) instead of forwarding that data request to a remote peripheral device (308); and then sending (1918) the held data request back to the peripheral device driver module as a response to the held data request after receiving a communication (310) that is in response to the dummy communication from the peripheral device.

7. The method of claim 1, wherein communications sent over the network (302) are buffered (314) at a peripheral device server (306), and the method further comprises changing (1930) the predetermined interval, thereby changing the number of communications which are buffered.

* * * * *

UNITED STATES PATENT AND TRADEMARK OFFICE
CERTIFICATE OF CORRECTION

PATENT NO.       : 7,647,446 B2
APPLICATION NO.  : 11/733312
DATED            : January 12, 2010
INVENTOR(S)      : Keiji Okuma It is certified that error appears in the above-identified patent and that said Letters Patent is hereby corrected as shown below:

Col. 25, line 1, should read:

1. A method of facilitating isochronous IN communication, comprising:
receiving (1902) from a peripheral device driver (402) a first communication (310) for a peripheral device (308);
sending (1904) a data request from the first communication over a network (302) toward the peripheral device;
noting (1906) passage of a predetermined interval without receipt of a second communication from the peripheral device driver; and then
creating (1908) a dummy communication (312) including the data request and sending (1910) it over the network toward the peripheral device, thereby maintaining an isochronous sequence of communication transmissions toward the peripheral device.

Col. 25, line 16, should read:

2. The method of claim 1, wherein the receiving step (1902) receives communications from a USB peripheral device driver (402), and the sending step (1904) sends a data request toward a USB peripheral device (308).

Col. 25, line 23, should read:

4. The method of claim 1, wherein the creating step (1908) copies, into the dummy communication (312), a data request from the communication that was most recently received (1902) from the peripheral device driver (402).

Signed and Sealed this

Eighteenth Day of May, 2010

David J. Kappos
*Director of the United States Patent and Trademark Office*